US006577638B1

United States Patent
Tashiro et al.

(10) Patent No.: US 6,577,638 B1
(45) Date of Patent: Jun. 10, 2003

(54) GATEWAY CARRYING OUT ROUTING OPTIMIZATION

(75) Inventors: Masayuki Tashiro, Kawasaki (JP); Kazuyuki Ohtsu, Kawasaki (JP); Hiroko Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/450,615

(22) Filed: Nov. 30, 1999

(30) Foreign Application Priority Data

Mar. 18, 1999 (JP) .......................................... 11-074364

(51) Int. Cl.7 ........................... H04L 12/28; G06F 15/16
(52) U.S. Cl. .................. 370/401; 370/352; 370/395.52; 709/241
(58) Field of Search ................................ 370/352, 356, 370/238, 238.1, 401, 395.6, 465; 709/238, 241, 245, 248

(56) References Cited

U.S. PATENT DOCUMENTS

| | | | | |
|---|---|---|---|---|
| 6,125,113 A | * | 9/2000 | Farris et al. ................. | 370/389 |
| 6,292,478 B1 | * | 9/2001 | Farris ......................... | 370/352 |
| 6,324,280 B2 | * | 11/2001 | Dunn et al. .................. | 379/230 |
| 6,327,258 B1 | * | 12/2001 | Deschaine et al. .......... | 370/456 |

FOREIGN PATENT DOCUMENTS

| | | |
|---|---|---|
| JP | 5-114904 | 5/1993 |
| JP | 6-232875 | 8/1994 |
| JP | 10-228431 | 8/1998 |

* cited by examiner

Primary Examiner—Hassan Kizou
Assistant Examiner—Afsar M. Qureshi
(74) Attorney, Agent, or Firm—Katten Muchin Zavis Rosenman

(57) ABSTRACT

A gateway is connected to the Internet and a telephone exchange which carries out routing optimization based on a first message and accommodates a plurality of terminals. The gateway includes: a call setting means used for determining an IP (Internet Protocol) address of a second gateway serving as a called communication partner on the basis of a second message serving as a request for call setting and used for opening a control channel to the second gateway by transmitting a third message to the second gateway at the IP address by way of the Internet; a first message transmitting means for transmitting a fourth message received from the connected telephone exchange to the second gateway by using the control channel; a second message transmitting means for transmitting a fifth message to the connected telephone exchange when receiving the fifth message transmitted by another telephone exchange connected to the second gateway through the control channel by way of the second gateway; an audio-channel opening means for opening an audio channel; and a channel releasing means for releasing the control channel and the audio channel.

10 Claims, 29 Drawing Sheets

F I G. 3

| | Calling-destination special number | Logical gateway number | IP address |
|---|---|---|---|
| GW1 | 700 | 1 | 000.000.000.001 |
| GW2 | 710 | 2 | 000.000.000.002 |
| GW3 | 720 | 3 | 000.000.000.003 |
| Term 01 | 01 | — | 000.000.000.004 |
| Term 02 | 02 | — | 000.000.000.005 |

FIG. 13
State of conversation between internal line B and internal line A
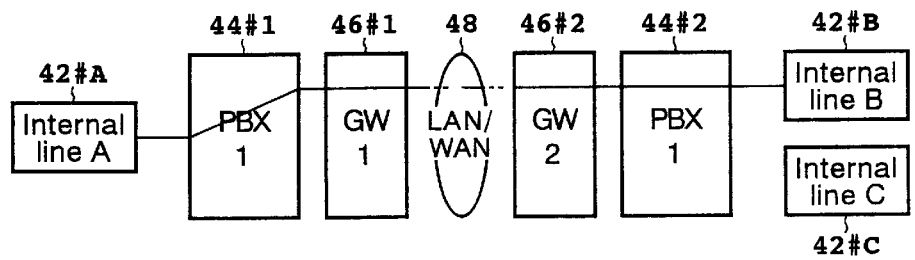
Press the transfer button and dial the internal line C at the internal line A
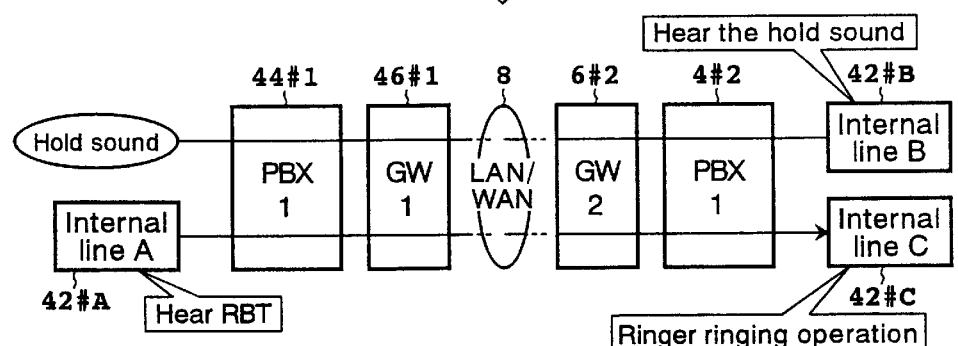
Cut off the internal line A
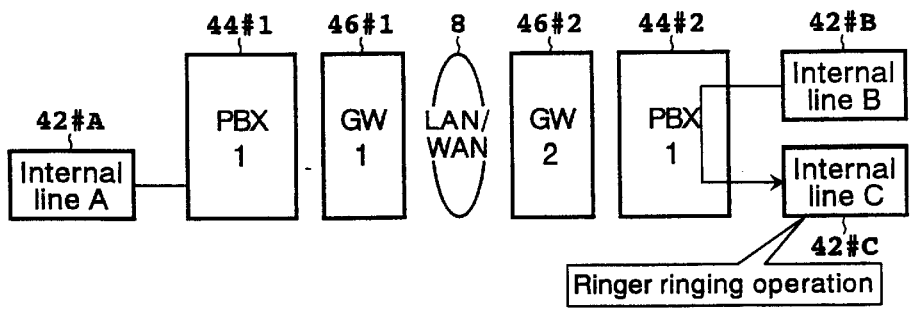

FIG. 14

| Protocol ID | |
|---|---|
| Reserve | Call number length |
| Call number | |
| 0 | Message Type |
| Transmission completion information element | |
| Repetition ID information element | |
| Transmission capability information elements | |
| Channel ID information element | |
| Facility information element | |
| Process ID information element | |
| Network specific | |
| Display information element | |
| Keypad facility information element | |
| Signal information element | |
| Future activation information element | |
| Future indication information element | |
| Call dial number information element | |
| Call subaddress information element | |
| Called party number information element | |
| Called party information element | |
| Tandem network selection information element | |
| Lower layer matching information element | |
| Higher layer matching information element | |
| User-user information element | |
| Constant shift code group6 information element | |
| General notice information element | |

| Transmission capability information element | | |
|---|---|---|
| Transmission capability contents length | | |
| Extension | Coding standard | Information transmission capability |
| Extension | Transmission mode | Information transmission rate |
| Extension | Layer1 ID | User information layer1 protocol |

FIG. 15

| Protocol ID | |
|---|---|
| Reserve | Call number length |
| Call number | |
| 0 | Message Type(FACILITY) |
| Transmission completion information element | |
| Repettion ID information element | |
| Transmission capability information elements | |
| Channel ID information element | |
| Facility information element (Transfer notice / Optimization request notice) | |
| Process ID information element | |
| Network specific | |
| Display information element | |
| Keypad facility information element | |
| Signal information element | |
| Future activation information element | |
| Future indication information element | |
| Call dial number information element | |
| Call subaddress information element | |
| Called party number information element | |
| Called party information element | |
| Tandem network selection information element | |
| Lower layer matching information element | |
| Higher layer matching information element | |
| User-user information element | |
| Constant shift code group6 information element | |
| General notice information element | |

| Transmission capability information element | | |
|---|---|---|
| Transmission capability contents length | | |
| Extension | Coding standard | Information transmission capability |
| Extension | Transmission mode | Information transmission rate |
| Extension | Layer1 ID | User information layer1 protocol |

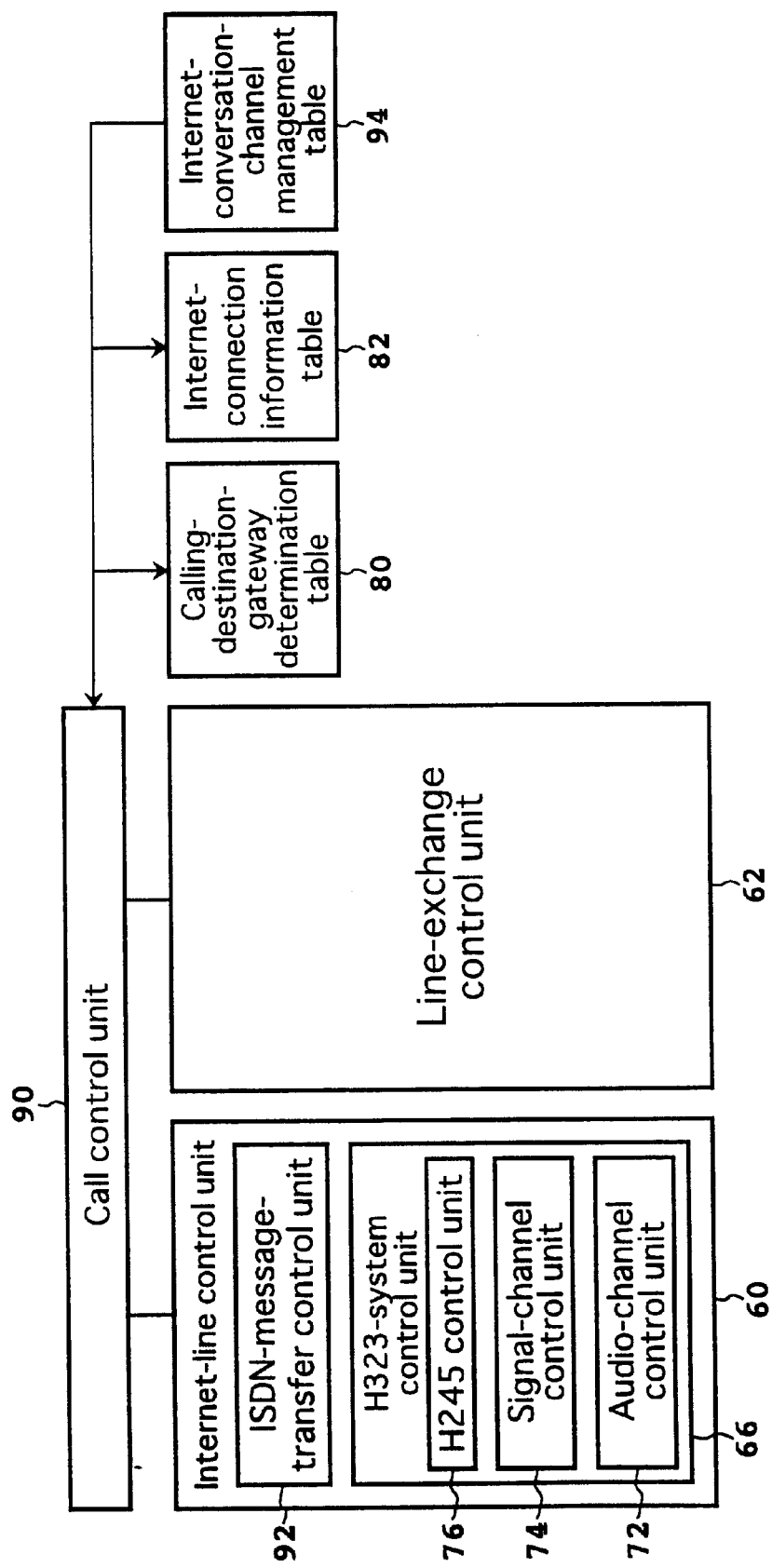

FIG. 32
State of conversation between internal line B and internal line A
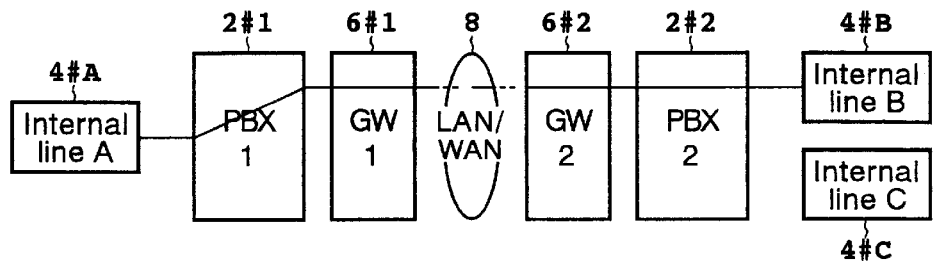
Press the transfer button and dial the internal line C at the internal line A
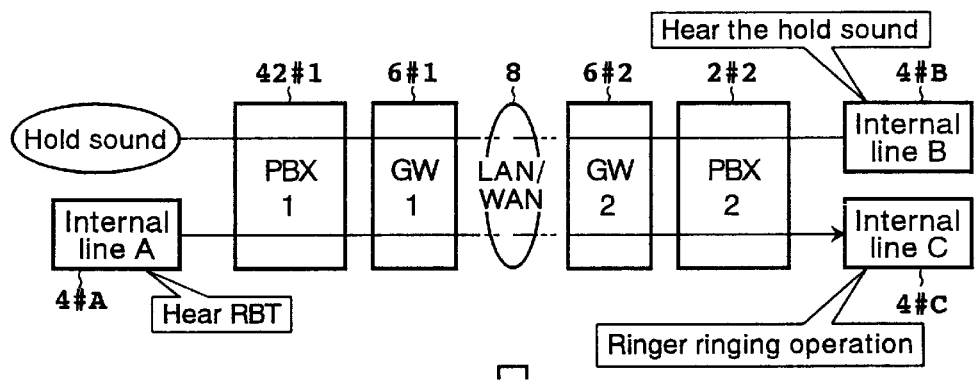
Cut off the internal line A
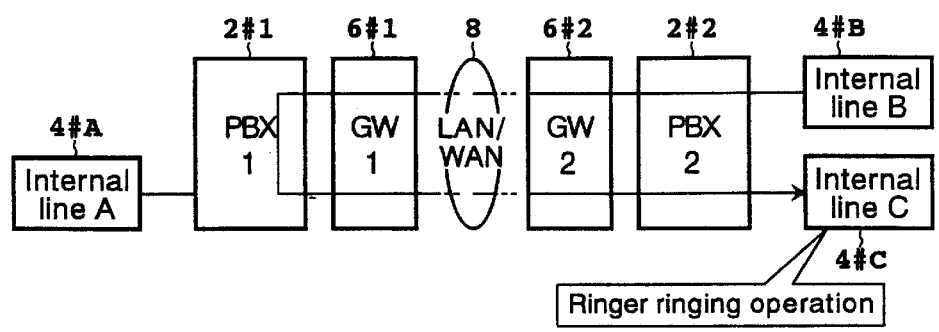

GATEWAY CARRYING OUT ROUTING OPTIMIZATION

BACKGROUND OF THE INVENTION

1. Field of the Invention

In general, the present invention relates to a gateway. More particularly, the present invention relates to a transmission service between telephone exchanges through the Internet.

2. Description of the Related Art

In recent years, with the progress of the network technology observed mainly as the wide-band of the LAN and the progress of the PC technology evidenced mainly by the increasing versatility of personal computers (PCs) and the increasing speed of CPUs, it has become possible to put transmission of audio data between PCs of a plurality of LANs at a high speed to practical use. By virtue of these technologies, it is possible to rapidly introduce application software and systems for transmitting sounds, which used to be transmitted by the conventional phones, between PCs on the Internet comprising LANs and WANs. Such a system is referred to as an Internet telephony. In addition, there has also been developed an Internet-telephony gateway for implementing internetwork communications between a telephone network and the Internet. Such an Internet-telephony gateway has a gateway function for conversion of the protocol of the telephone network into the protocol of the Internet or vice versa. In addition, there is also a system for relaying a communication between telephone exchanges by using an Internet-telephony gateway. Such a system is known as a bypass by an Internet telephony.

In general, a telephone conversation through a bypass by an Internet telephony costs less than a telephone conversation through the telephone network. For this reason, the bypass system and its services are becoming popular very fast. So far, there has not been established a technology of a transfer service for transferring a call from a terminal accommodated in a telephone exchange of a bypass system using an Internet-telephony gateway to a terminal accommodated in another telephone exchange in a conversation. In the use of a transfer function of a telephone exchange simply for implementation of a transfer service in a bypass system using an Internet-telephony gateway, the following problems are encountered.

FIG. 32 is a diagram showing a problem encountered in the conventional system. Assume that, while a terminal 4#A accommodated in a telephone exchange 2#1 is having a conversation with a terminal 4#B of a telephone exchange 2#2, a transfer service from the terminal 4#A to a terminal 4#C of the telephone exchange 2#2 is simply executed. In this case, the transfer service is executed as follows.

At the terminal 4#A, a transfer button is pressed and the number of the terminal 4#C is dialed while the terminal 4#A is having a conversation with the terminal 4#B. The telephone exchange 2#1 transmits a call signal to the telephone exchange 2#2 by way of a gateway 6#1, the Internet 8 and a gateway 6#2, calling the terminal 4#C and establishing a connection with the terminal 4#C. As a result, 2 paths are stretched over the Internet 8 for the terminal 4#A to be used in conversations with the terminals 4#B and 4#C. When the terminal 4#A is cut off from communication (put in an on-hook state), the telephone exchange 2#1 connects the path connected to the terminal 4#B and the path connected to the terminal 4#C. In this state of connection, a transfer service is rendered between the terminals 4#B and 4#C through the telephone exchange 2#2, the gateway 6#2, the Internet 8, the gateway 6#1 and the telephone exchange 2#1. At that time, Internet lines which are not actually required are used by the telephone exchanges 2#1 and 2#2 wastefully. In addition, audio data generated by the terminals 4#B and 4#C are subjected to audio encoding and audio decoding in the gateways 6#1 and 6#2 under audio CODEC control and compressed audio data is transmitted through the Internet 8. As described above, the Internet lines are used wastefully and, in consequence, unnecessary audio CODEC control is executed on audio data exchanged by the gateways 6#1 and 6#2. As a result, there is raised a problem of a deteriorating audio quality.

SUMMARY OF THE INVENTION

It is thus an object of the present invention addressing the problems described above to provide a gateway that is capable of connecting paths effectively during a transfer through the Internet, efficiently utilizes an Internet line and does not wastefully execute audio CODEC control.

In accordance with one aspect of the present invention, there is provided a gateway connected to the Internet and a telephone exchange accommodating a plurality of terminals and carrying out routing optimization processing based on a first message used as a request for path optimization, the gateway comprising: a call setting means for: determining an IP (Internet Protocol) address of a second gateway corresponding to a calling-destination special number of a called telephone exchange used as a called communication partner and connected to the second gateway on the basis of a second message which is received from the connected telephone exchange, includes the calling-destination special number of the called telephone exchange and a telephone number of a called terminal accommodated in the called telephone exchange and serves as a request for call setting; and transmitting a third message serving as a request for the call setting to the second gateway serving as a communication partner by using the IP address by way of the Internet to open a control channel to the second gateway; a first message transmitting means for setting a fourth message received from the connected telephone exchange in a message to be transmitted by using the control channel and transmitting the message to the second gateway serving as a communication partner by way of the Internet; a second message transmitting means for extracting a fifth message and transmitting the fifth message to the connected telephone exchange when receiving a message coming from the control channel and including the fifth message set therein and transmitted by the called telephone exchange; an audio-channel opening means for opening an audio channel for a conversation between a calling terminal accommodated in the connected telephone exchange and the called terminal when receiving a message including a set sixth message issued by the called telephone exchange serving as a called communication partner through the control channel in response to the third message; and a channel releasing means for releasing the control channel and the audio channel when receiving a message including a set seventh message serving as a request for releasing of the control channel and the audio channel from the control channel.

In accordance with another aspect of the present invention, there is provided a gateway connected to the Internet and a telephone exchange accommodating a plurality of terminals and carrying out routing optimization processing based on a first message used as a request for path optimization, the gateway comprising: a call setting means for: determining an IP (Internet Protocol) address of a second gateway corresponding to a calling-destination special number of a called telephone exchange used as a called communication partner and connected to the second gateway on the basis of a second message which is received from the connected telephone exchange, includes the calling-destination special number of the called telephone exchange and a telephone number of a called terminal accommodated in the called telephone exchange and serves as a request for call setting; and transmitting a third message serving as a request for the call setting to the second gateway serving as a communication partner by using the IP address by way of the Internet to open a control channel and a first audio channel to the second gateway; a first message transmitting means for transmitting a fourth message received from the connected telephone exchange by using the first audio channel to the second gateway serving as a communication partner by way of the Internet; a second message transmitting means for extracting a fifth message and transmitting the fifth message to the connected telephone exchange when receiving the fifth message transmitted by the called telephone exchange through the first audio channel; an audio-channel opening means for opening a second audio channel for a conversation between a calling terminal accommodated in the connected telephone exchange and the called terminal when receiving a sixth message issued by the called telephone exchange serving as a called communication partner through the first audio channel in response to the third message; and a channel releasing means for releasing the control channel, the first audio channel and the second audio channel when receiving a seventh message serving as a request for releasing of the control channel, the first audio channel and the second audio channel from the first audio channel.

The above and other objects, features and advantages of the present invention as well as the manner of realizing them will become more apparent, and the invention itself will be best understood from a study of the following description and appended claims with reference to attached drawings showing some preferred embodiments of the invention.

BRIEF DESCRIPTION OF THE DRAWINGS

FIG. 3 is a diagram showing relations between gateways and information including IP addresses;

FIG. 13 is a diagram showing how paths are connected in an Internet transfer service provided by the first embodiment of the present invention;

FIG. 14 is a diagram showing ISDN message;

FIG. 15 is a diagram showing ISDN-FACILITY message (Transfer Notice/Optimization Request Notice);

FIG. 16 is a diagram showing the configuration of a gateway implemented by a second embodiment of the present invention;

FIG. 32 is a diagram showing a problem encountered in the conventional system.

DESCRIPTION OF THE PREFERRED EMBODIMENTS

Figure 1:
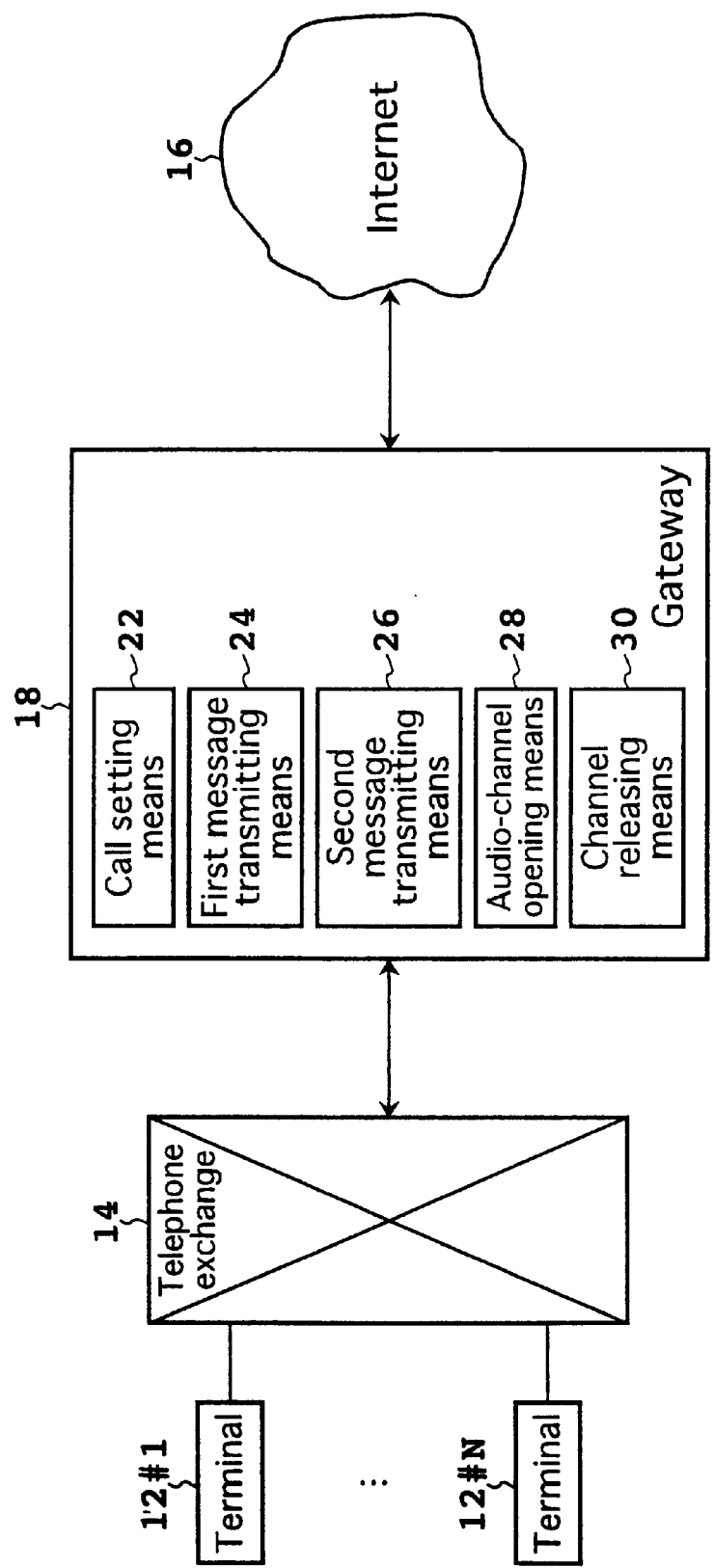
FIG. 1 is a diagram showing the principle underlying the present invention.

Before preferred embodiments of the present invention are explained, first of all, a principle underlying the invention is described by referring to FIG. 1. As shown in the figure, a gateway 18 accommodates a plurality of terminals 12#i (where i=1 to N). The gateway 18 is connected to the Internet 16 and a telephone exchange 14 which carries out routing optimization processing based on a first message containing a request for path optimization. The gateway 18 has a call setting means 22 for carrying out call setting comprising the steps of: determining an IP address of a second gateway associated with a calling-destination special number of a called telephone exchange used as a called communication partner and connected to the second gateway on the basis of a second message containing a request for call setting which is received from the telephone exchange 14 connected to the gateway 18 and includes the calling-destination special number of the called telephone exchange and a telephone number of a called terminal accommodated in the called telephone exchange; transmitting a third message containing the request for call setting to the second gateway serving as a communication partner by using the IP address by way of the Internet 16; and opening a control channel between the gateway 18 and the second gateway.

The gateway 18 also has a first message transmitting means 24 for carrying out message transmission comprising the steps of: setting a fourth message received from the telephone exchange 14 connected to the gateway 18 in a message to be transmitted by using the control channel; and transmitting the message to the second gateway serving as a communication partner by way of the Internet 16.

Furthermore, the gateway 18 also has a second message transmitting means 26 for carrying out message transmission comprising the steps of: receiving a message from the called telephone exchange through the control channel, where a fifth message is set; extracting the fifth message; and transmitting the fifth message to the telephone exchange 14 connected to the gateway 18.

In addition, the gateway 18 also has an audio-channel opening means 28 for carrying out audio-channel opening comprising the steps of: receiving a message from the called telephone exchange specified in the second message through the control channel for the message in which a sixth message containing a response to the second message is set; and opening an audio channel for a conversation between a calling terminal accommodated in the called telephone exchange and a called terminal.

Moreover, the gateway 18 also has a channel releasing means 30 for releasing the control channel and the audio channel when a message is received through the control channel, where a seventh message serving as a request for releasing of the control channels and the audio channel is set.

With the configuration described above, assume that the user of a terminal 12#1 accommodated in the telephone exchange 14 connected to a gateway 18 dials the calling-destination special number of a called telephone exchange and the telephone number of a called terminal accommodated in the called telephone exchange. In this case, the telephone exchange 14 transmits a second message containing a call setting request specifying the calling-destination special number of the called telephone exchange and the telephone number of the called terminal to the gateway 18. The call setting means 22 first of all determines an IP address of a second gateway to serve as a called gateway connected to the called telephone exchange in accordance with the calling-destination special number specified in the second message. The call setting means 22 then transmits a third message containing the request for call setting to the called gateway by using the IP address by way of the Internet 16, opening a control channel between the gateway 18 and the called gateway. A called telephone exchange transmits a first message containing a request for path optimization and a plurality of messages each containing a request to release a control channel to the gateway 18. The first message transmitting means 24 sets a fourth message received from the telephone exchange 14 in a message to be transmitted by using the control channel and transmits the message to the called gateway serving as a communication partner. The second message transmitting means 26 extracts a fifth message from a message when receiving the message that is each of messages containing the requests from a telephone exchange connected to the gateway serving as a communication partner through the control channel for the message in which the fifth message is set, and then transmits the fifth message to the telephone exchange 14 connected to the gateway 18. The telephone exchange 14 receives the fifth message and carries out processing for the terminal 12#1 accommodated in the telephone exchange 14. In this way, the telephone exchange 14 is capable of transmitting and receiving messages including the first and second messages to and from the called telephone exchange serving as a communication partner.

When receiving a message from the called telephone exchange specified in the second message through a control channel, that a sixth message containing a response to the second message is set, the audio-channel opening means 28 opens an audio channel for a conversation between the calling terminal 12#1 and the called terminal accommodated in the called telephone exchange. The calling terminal 12#1 then has a conversation with the called terminal by using this audio channel. Assume that a transfer operation by the calling terminal 12#1 or the called terminal is carried out during the conversation. To be more specific, let that the user of the calling terminal 12#1 carry out a transfer operation to another terminal accommodated in the called telephone exchange. In this case, the processing described above is carried out to open a control channel and an audio channel for a conversation between the calling terminal 12#1 and the other terminal. Then, the calling terminal 12#1 is cut off from the communication. At that time, the telephone exchange 14 transmits a message containing a transfer notice and a first message containing a request for routing optimization to the gateway 18. These messages are then passed on to the called telephone exchange by way of the gateway serving as a communication partner. The called telephone exchange optimizes the routing in accordance with the message containing a transfer notice and the first message containing a request for routing optimization. As the optimization is completed, a message containing a notice of processing completion is transmitted to the telephone exchange 14. Receiving the processing-completion message, the telephone exchange 14 transmits the seventh message serving as a request for a connection release to the telephone exchange serving as a communication partner. Receiving the connection release, the telephone exchange serving as a communication partner releases the connection. When the channel releasing means 30 receives a message in which the seventh message is set from the control channel, the channel releasing means 30 releases the audio channel and the control channel relevant to the seventh message.

First Embodiment

Figure 2:
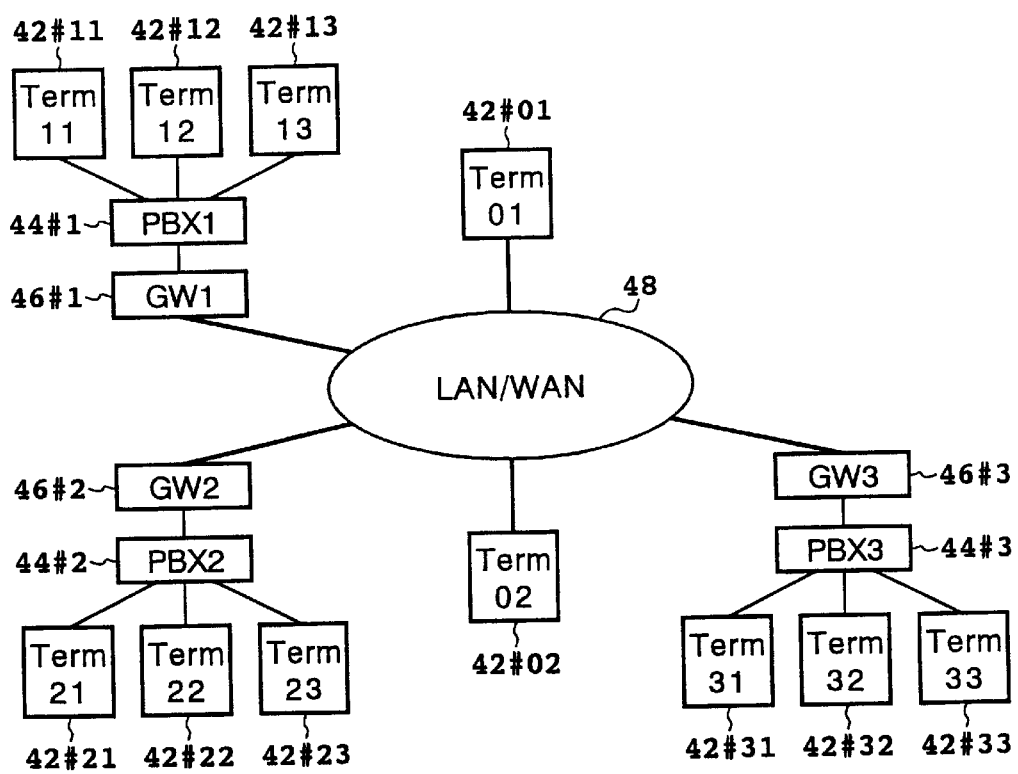
FIG. 2 is a diagram showing the configuration of an Internet-telephony gateway system implemented by an embodiment of the present invention.

FIG. 2 is a diagram showing the configuration of an Internet-telephony gateway system implemented by an embodiment of the present invention. As shown in the figure, the Internet-telephony gateway system comprises a plurality of terminals 42#ij (where i=1, . . . and j=1, . . . ), a plurality of telephone exchanges (PBXs) 44#i (where i=1, . . . ) and a plurality of gateways 46#i (where i=1, . . . ).

The terminals 42#ij are accommodated in the telephone exchange 44#i. The telephone exchange 44#i which accommodates the terminals 42#ij has a calling-destination special number assigned thereto. For example, calling-destination special numbers 700, 710 and 720 are assigned to the telephone exchanges 44#1, 44#2 and 44#3 respectively. Terminals 42#01 and 42#02 are personal computers connected to the Internet 48. The gateway 46#i is connected between the telephone exchange 44#i and the Internet 48. The gateway 46#i is connected to the telephone exchange 44#i by an ISDN line. In this embodiment, the gateway 46#i is connected to the telephone exchange 44#i on a one-to-one basis. It should be noted that, however, that the gateway 46#i can also be connected to n telephone exchanges 44#i where n≧2. The Internet 48 is a LAN or a WAN which carries out communications by using a TCP/IP protocol.

Assigned to the gateway 46#i are a logical gateway number and an IP (Internet Protocol) address for connection to the Internet 48. Logical gateway numbers assigned to the gateways 46#i in the whole Internet-telephony gateway system are sequential numbers starting with 1.

FIG. 3 is a diagram showing relations between gateways and information including IP addresses assigned to the gateways. As shown in the figure, information associated with the gateway 46#1 includes the calling-destination special number 700 of the telephone exchange 44#1 accommodating the gateway 46#1, a logical gateway number of 1 and an IP address of "000.000.000.001". Likewise, information associated with the gateway 46#2 includes the calling-destination special number 710 of the telephone exchange 44#2 accommodating the gateway 46#2, a logical gateway number of 2 and an IP address of "000.000.000.002". Similarly, information associated with the gateway 46#3 includes the calling-destination special number 720 of the telephone exchange 44#3 accommodating the gateway 46#3, a logical gateway number of 3 and an IP address of "000.000.000.003". The terminal 42#01 is associated with a calling-destination special number of 01 and an IP address of "000.000.000.004" whereas the terminal 42#02 is associated with a calling-destination special number of 02 and an IP address of "000.000.000.005".

Figure 4:
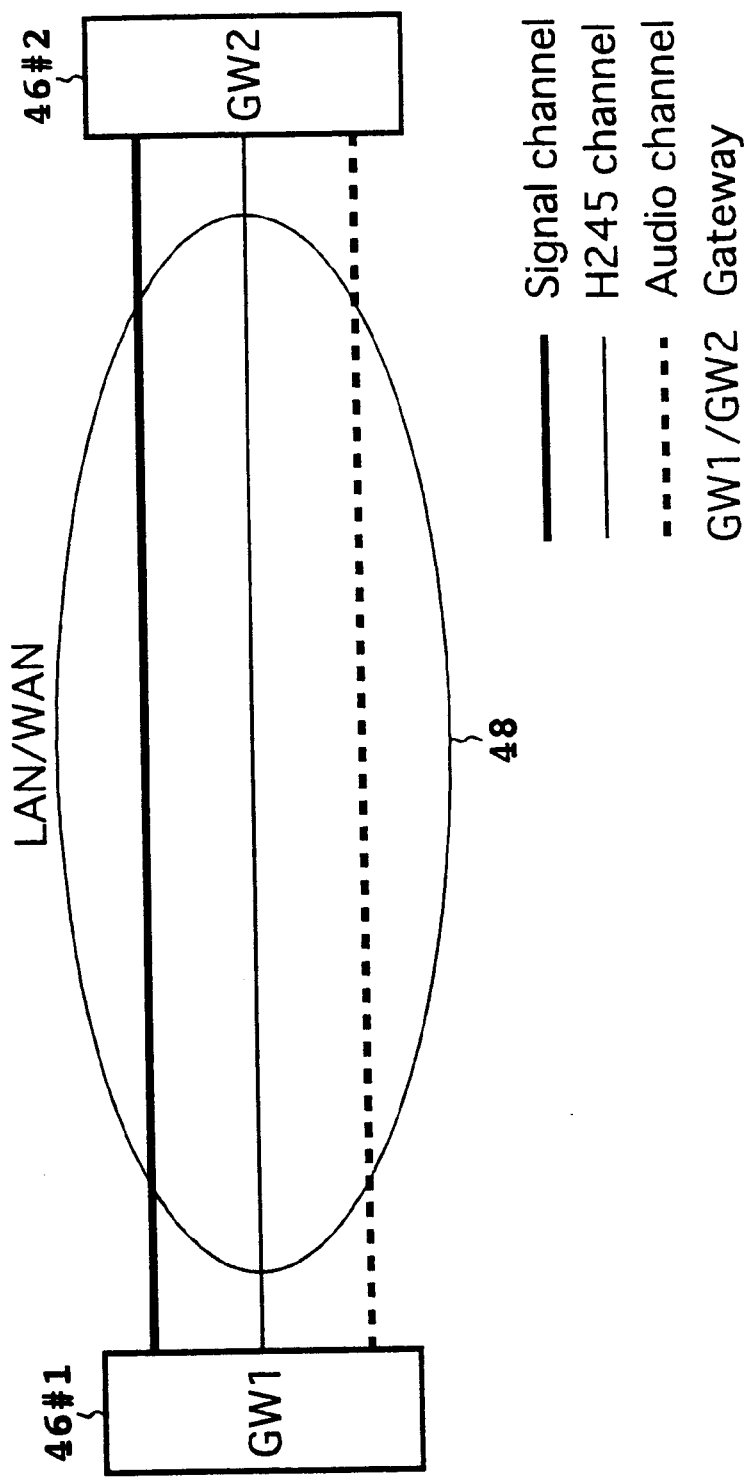
FIG. 4 is a diagram showing the configuration of a connection between 2 gateways.

FIG. 4 is a diagram showing the configuration of a connection between 2 gateways. As shown in the figure, the gateway 46#i is connected to the gateway 46#j, where i≠j, by an H323 channel through the Internet 48. The H323 channel comprises a signal channel, an H245 channel and an audio channel. Used for controlling a call, the signal channel is connected in accordance with a Q931 user information message procedure of the H323 channel. Used for channel negotiation, the H245 channel has a function used by the 2 Internet-telephony gateways to mutually tell a conversation channel and a function for determining media to be used by exchanging media capabilities that the 2 gateways connected to each other have, such as audio, video and data. The audio channel is used for transmitting information such as a sound, a picture and data determined by the H245 channel.

Figure 5:
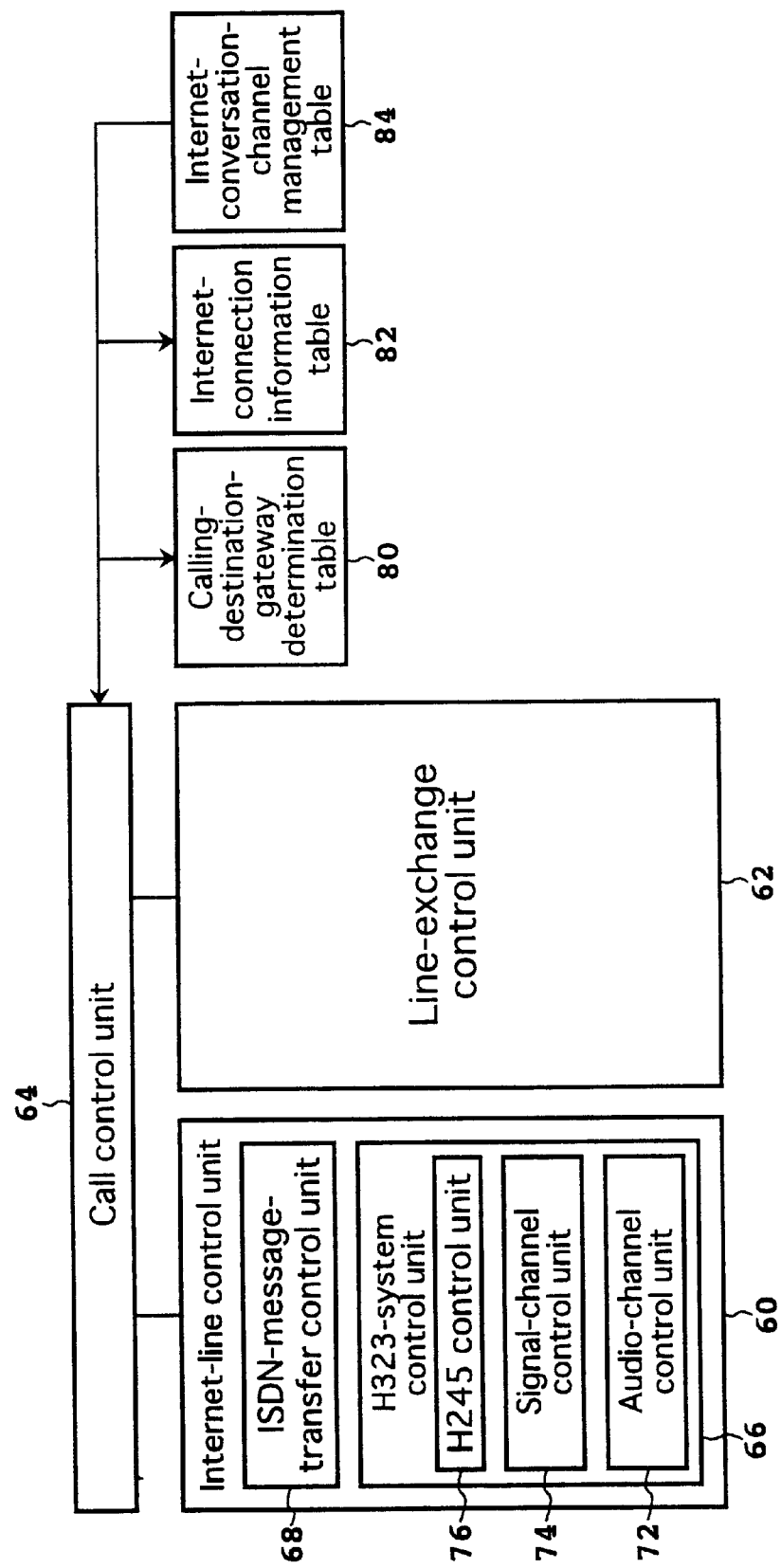
FIG. 5 is a diagram showing the configuration of a gateway implemented by a first embodiment of the present invention.

FIG. 5 is a diagram showing the configuration of a gateway implemented by a first embodiment of the present invention. As shown in the figure, the gateway 46 comprises an Internet-line control unit 60, a line-exchange control unit 62 and a call control unit 64. The Internet-line control unit 60 has a function to extract signals of the signal channel, the H245 channel and the audio channel coming from the Internet 48 and request the call control unit 64 to carry out processing. In addition, the Internet-line control unit 60 also has a function to set signals in the signal channel, the H245 channel and the audio channel on the basis of a request received from the call control unit 64 and transmit the signals to the Internet 48. The Internet-line control unit 60 includes an ISDN-message-transfer control unit 68 and an H323-system control unit 66. The ISDN-message-transfer control unit 68 has a function to set a message in an information element of an H323•Q931 user information message of the signal channel in accordance with a request made by the call control unit 64. In addition, the ISDN-message-transfer control unit 68 also has a function to extract an information element from a user information message of the signal channel in accordance with a request made by a signal-channel control unit 74 employed in the H323-system control unit 66. Particularly, in this embodiment, in order to transmit an ISDN message originated by the telephone exchange 44#i to another gateway, a new information element referred to as an ISDN-message-transfer information element has been added to the H323•Q931 user information message. The ISDN message transmitted by the telephone exchange 44#i has been set in the newly added ISDN-message-transfer information element. The ISDN message transmitted by the telephone exchange 44#i is extracted from the ISDN-message-transfer information element newly added to the H323•Q931 user information message. In order to determine whether the H323•Q931 user information message includes a newly added ISDN-message-transfer information element containing an ISDN message transmitted by the telephone exchange 44#i, a group of information elements is checked for existence of an information element with an information-element identifier indicating the newly added ISDN-message-transfer information element.

Figure 6:
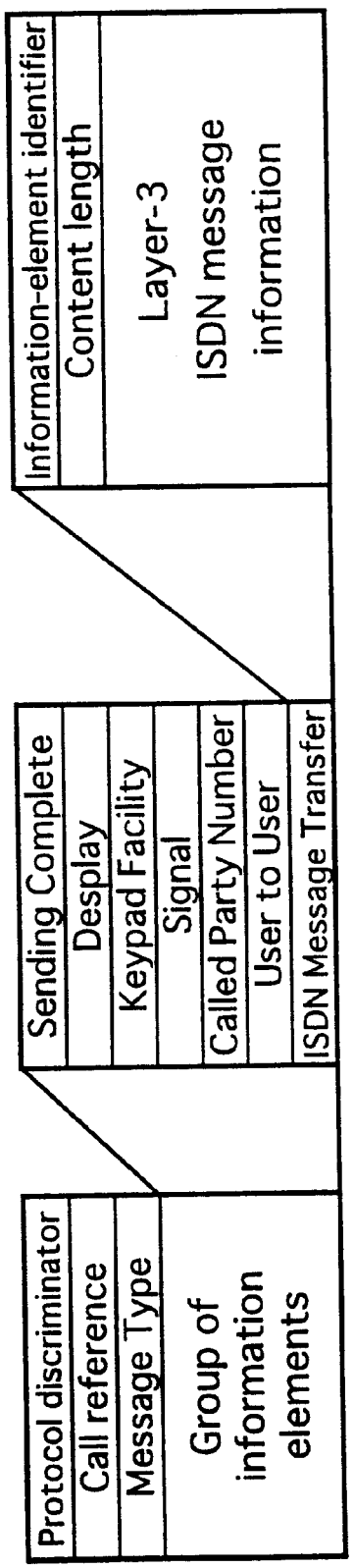
FIG. 6 is a diagram showing information elements of an H323 user information message.

FIG. 6 is a diagram showing information elements of an H323 user information message. As shown in the figure, the H323 user information message comprises a header and a group of information elements. The header includes a protocol discriminator, a call reference and a message type whereas the group of information elements includes a sending complete, a display, a keypad facility, a signal, a called-party number, a user-to user and an ISDN message transfer. The information element called the ISDN message transfer comprises an information-element identifier (or an information-element identification code), a content length expressed in terms of bytes and layer-3 ISDN message information. The information-element identifier is a code indicating that the information element is an ISDN-message-transfer information element. In this embodiment, an ISDN message edited in the telephone exchange 44#i is set in the layer-3 ISDN message information of the ISDN-message-transfer information element.

Figure 7:
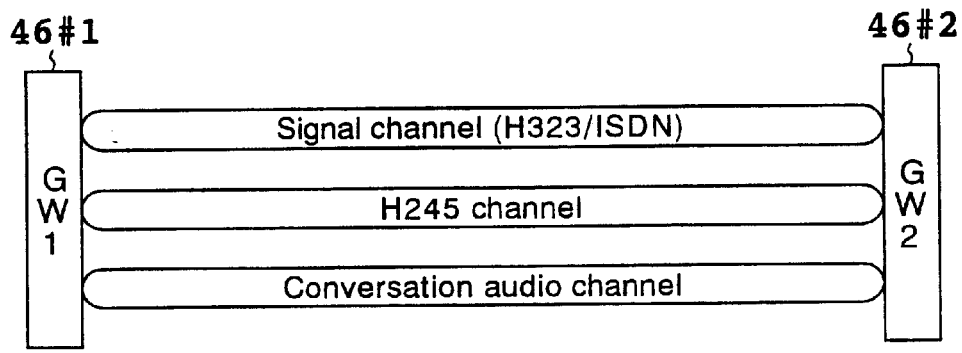
FIG. 7 is a diagram showing an H323 channel provided by the first embodiment of the present invention.

FIG. 7 is a diagram showing an H323 channel provided by the first embodiment of the present invention. As shown in the figure, in the first embodiment, the H323 channel comprises a signal channel, an H245 channel and a conversation audio channel. In order to transmit and receive an ISDN message between telephone exchange 44#i, 44#j, ISDN-message transfer information element of the signal channel is used. On the other hand, the H245 channel and the conversation audio channel are used in a normal way. The audio-channel control unit 72 carries out RTP/RTCP communications between the gateways 46#i in accordance with a command issued by the call control unit 64 to open an audio channel, to transmit and receive signals set in the opened audio channel and to release the opened audio channel. Further the audio-channel control unit 72 transmits and receives a signal in accordance with a media capability set by the H245 control unit 76.

The signal-channel control unit 74 opens a signal channel, transmits/receives a signal including an information element of an H323 user information message to/from the opened signal channel and releases the signal channel in accordance with a command received from the call control unit 64. The signal-channel control unit 74 also has a function to give a command to the ISDN-message-transfer control unit 68 to extract an information element of an H323 user information message. The H245 control unit 76 exchanges information on media capabilities such as audio, video and data handling capabilities of the Internet-telephony gateway 46#i with the gateway serving as a communication partner by using the 245 channel in accordance with a command received from the call control unit 64.

Figure 8:
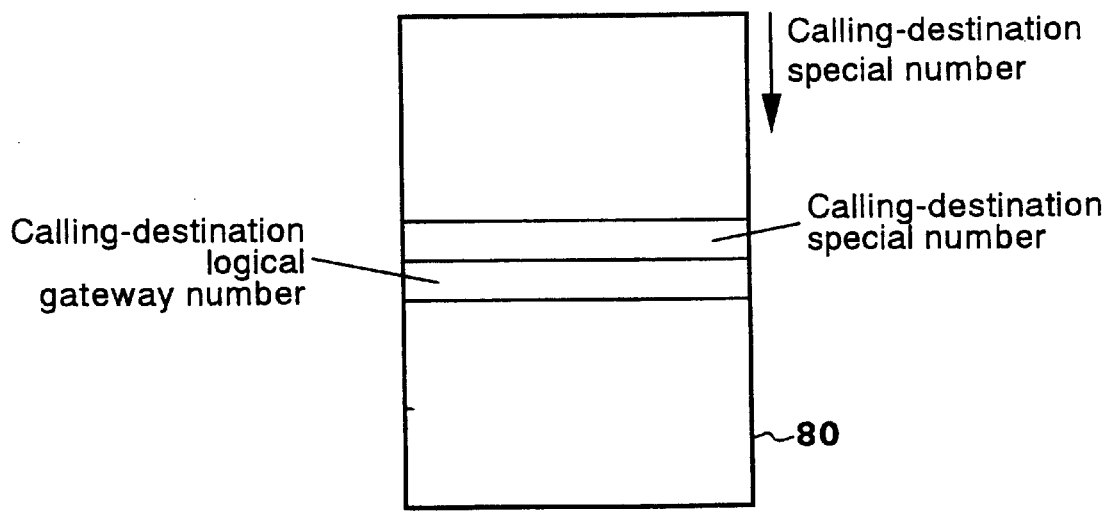
FIG. 8 is a diagram showing the structure of a calling-destination-gateway determination table employed in the configuration of the gateway shown in FIG. 5.

The line-exchange control unit 62 receives a signal from the telephone exchange 44#i and separates an ISDN message from the signal, supplying the message to the call control unit 64. On the other hand, the line-exchange control unit 62 outputs an ISDN message received from the gateway serving as a communication partner and extracted by the ISDN-message-transfer control unit 68 as described above to the telephone exchange 44#i in accordance with a command issued by the call control unit 64. The call control unit 64 has a calling-destination-gateway determination table 80, an Internet-connection information table 82 and an Internet-conversation-channel management table 84. FIG. 8 is a diagram showing the structure of the calling-destination-gateway determination table 80 employed in the configuration of the gateway shown in FIG. 5. As shown in FIG. 8, in the calling-destination-gateway determination table 80 is stored an array of elements each containing the calling-destination special number of a telephone exchange 44#j connected to a gateway 46#j and the calling-destination logical gateway number of the gateway 46#j at a memory area corresponding to the calling-destination special number used as the subscript (index) of the element. Each of the elements in the array is associated with one of all other gateways 46#j (where j≠i) composing the Internet-telephony gateway system and are input from a maintenance console which is not shown in the figure.

Figure 9:
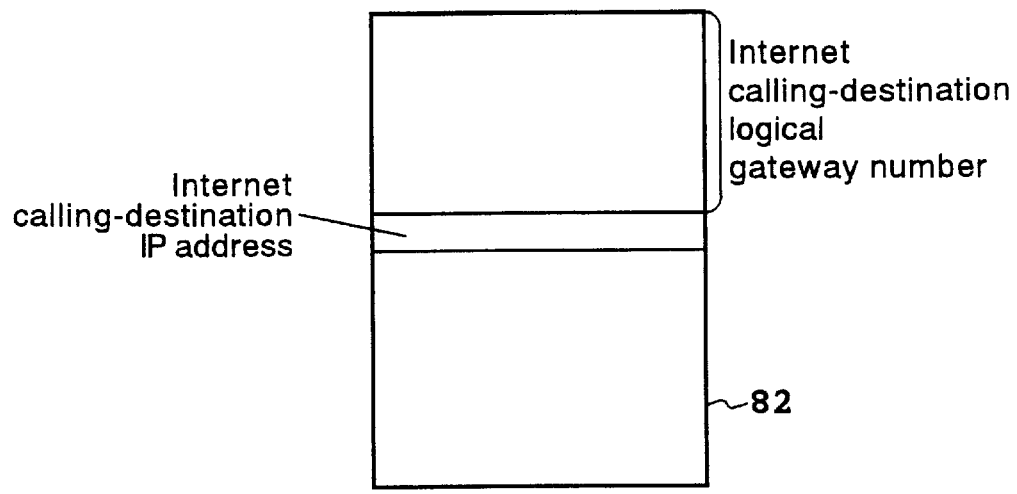
FIG. 9 is a diagram showing the structure of an Internet-connection information table employed in the configuration of the gateway shown in FIG. 5.

FIG. 9 is a diagram showing the structure of the Internet-connection information table 82 employed in the configuration of the gateway shown in FIG. 5. As shown in FIG. 9, in the Internet-connection information table 82 is stored an array of Internet calling-destination IP addresses of the other gateways 46#j at a memory area corresponding to the calling-destination logical gateway numbers of the gateways 46#j in the calling-destination-gateway determination table 80 used as the subscripts (the indexes) of array elements. First of all, the calling-destination-gateway determination table 80 is searched for a calling-destination logical gateway number with a calling-destination special number used as an index. Then, the Internet-connection information table 82 is searched for an Internet calling-destination IP address by using the calling-destination logical gateway number found in the search of the calling-destination-gateway determination table 80 as an index. The Internet calling-destination IP address is used in communications according to a protocol prescribed by the H323 specifications between the gateways 46#i and 46#j through the Internet 48. It should be noted that, in place of the calling-destination-gateway determination table 80 and the Internet-connection information table 82, it is also possible to use a table where Internet calling-destination IP addresses at a memory area corresponding to calling-destination special numbers each used as an index is stored.

Figure 10:
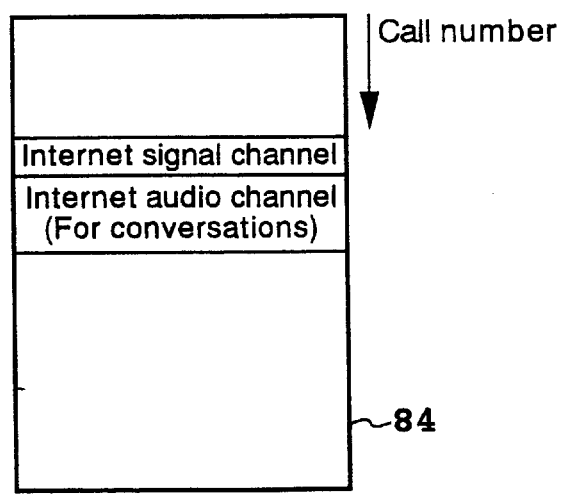
FIG. 10 is a diagram showing the structure of an Internet-conversation-channel management table employed in the configuration of the gateway shown in FIG. 5.

FIG. 10 is a diagram showing the structure of an Internet-conversation-channel management table 84 employed in the configuration of the gateway shown in FIG. 5. As shown in FIG. 10, in the Internet-conversation-channel management table 84 is stored an array of elements each comprising an Internet-signal-channel number and an Internet-audio-channel number at a memory area corresponding to a call number uses as a subscript (index) of the element. The call number is a number corresponding to a call number set in an ISDN-setup message received from the telephone exchange 44#i. Determined by a call number set in an ISDN-SETUP message, an Internet-signal-channel number and an Internet-audio-channel number are respectively the numbers of a signal channel and an audio channel to be opened. The Internet-conversation-channel management table 84 is also used to determine the numbers of an opened signal channel and an opened audio channel to be released from an ISDN-REL_COMP message.

The call control unit 64 has the following functions:

(1) Analyze an ISDN message output by the line-exchange control unit 62 and carry out the following processing.

(1)-a When an ISDN-SETUP message is received from the telephone exchange 44#i, the calling-destination-gateway determination table 80 and the Internet-connection information table 82 are searched for an IP address of a calling-destination gateway from a calling-destination special number specified in the called-party-number information element of the ISDN-SETUP message. A SETUP message and a command requesting call setting are then output to the signal-channel control unit 74 that transmits the SETUP message by using the Internet calling-destination IP address in accordance with the H323 message procedure. A command to open an H245 signal channel is then given to the H245 control unit 76.

(1)-b The ISDN-message-transfer control unit 68 is requested to set a message received from the telephone exchange 44#i in the ISDN message transfer information element newly added to the H323•Q931 user information message. Examples of a message received from the telephone exchange 44#i are ISDN-SETUP, ALERT, CONN, FACILITY, FACILITY_ACK, DISC, REL and REL_COMP. The signal-channel control unit 74 is then requested to transmit the message set by the ISDN-message-transfer control unit 68 by using a signal channel indicated by a call number of the ISDN message.

(2) Carry out processing for a message received from the Internet 48 through a signal channel.

(2)-a The line-exchange control unit 62 is requested to transmit an ISDN message set in the ISDN message transfer information element newly added to the H323•Q931 user information message received from the Internet 48.

(2)-b When an ALERT/CONN message is received, the audio-channel control unit 72 is requested to open an audio channel.

(2)-c When, an REL_COMP message is received, a call number is used as an index to search the Internet-conversation-channel management table 84 for numbers of an opened signal channel and an opened audio signal. The signal-channel control unit 74 and the audio-channel control unit 72 are then requested to release respectively the opened signal channel and the opened audio signal indicated by the numbers found in the search.

Figure 11:
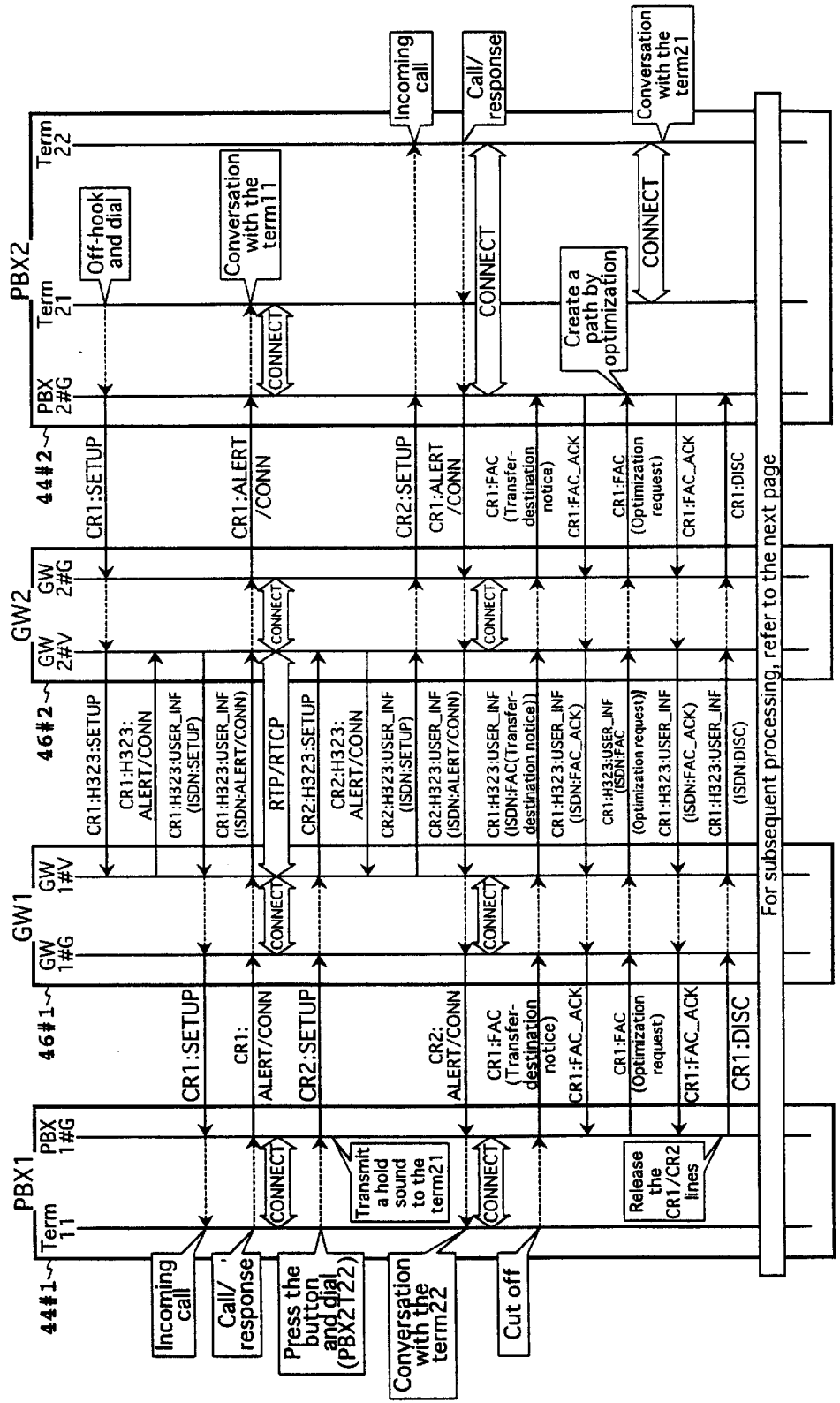
FIG. 11 is a diagram showing a message sequence provided by the first embodiment of the present invention.
Figure 12:
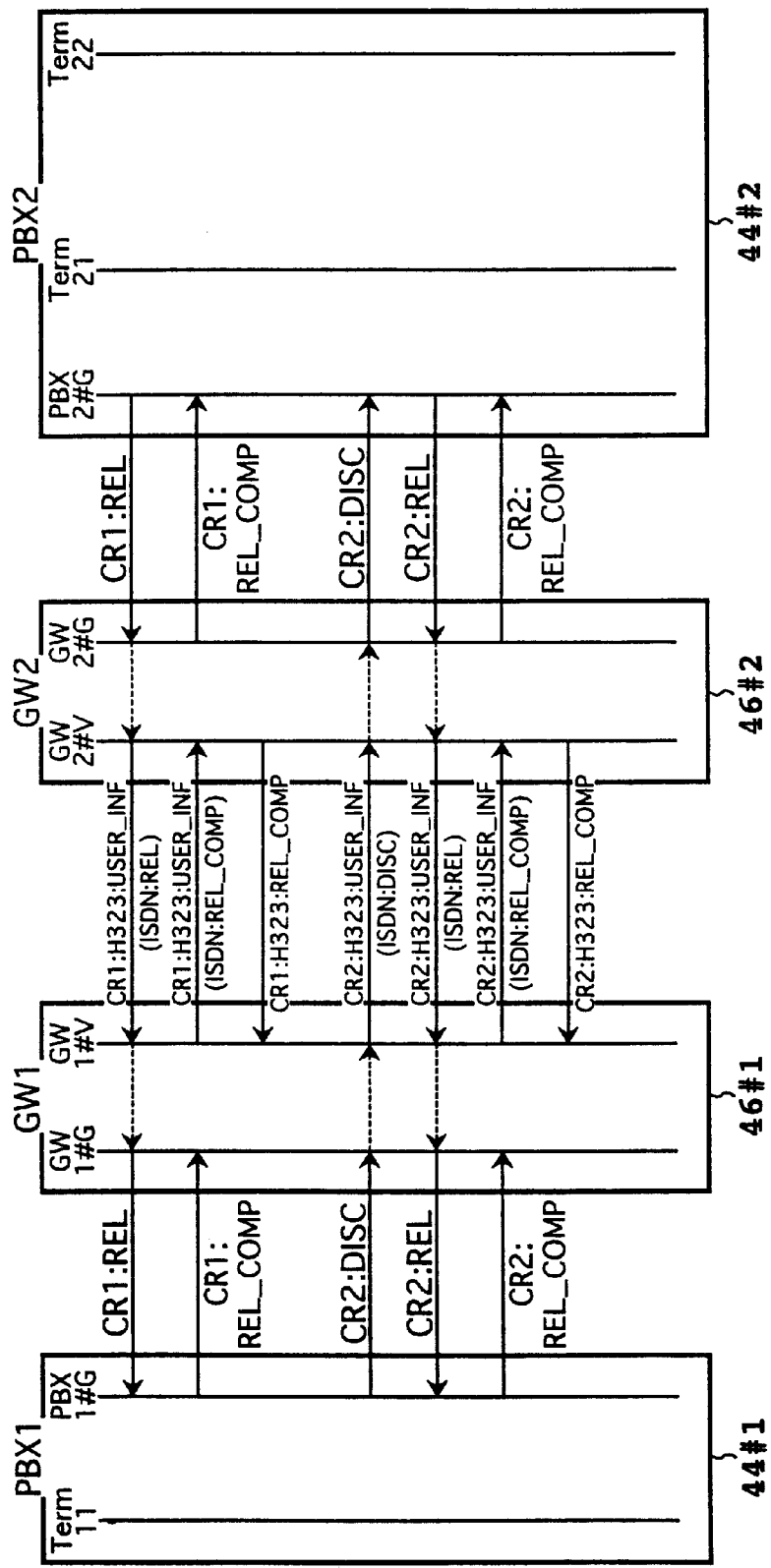
FIG. 12 is a diagram showing a message sequence provided by the first embodiment of the present invention.

FIGS. 11 and 12 are each a diagram showing a message sequence of the Internet-telephony gateway system provided by the first embodiment of the present invention. FIG. 13 is a diagram showing how paths are connected in an Internet transfer service provided by the first embodiment of the present invention. FIG. 14 is a diagram showing ISDN message. FIG. 15 is a diagram showing ISDN-FACILITY message(Transfer Notice/Optimization Request Notice). The following description explains the operation of the Internet-telephony gateway system provided by the first embodiment by referring to these figures. In this embodiment, as an example, the terminal 42#21 accommodated in the telephone exchange 44#2 makes a call to the terminal 42#11 accommodated in the telephone exchange 44#1. Then, in the course of a conversation between the terminals 42#21 and 42#11, the user of the terminal 42#11 presses the transfer button to make a call to the terminal 42#22 accommodated in the telephone exchange 44#2 and a transfer thereto. As shown in FIG. 11, the terminal 42#21 accommodated in the telephone exchange 44#2 is put in an off-hook state, dialing the calling-destination special number 700 of the telephone exchange 44#1 and the internal-line number 11 of the terminal 42#11.

According to the format shown in FIG. 14, the telephone exchange 44#2 sets the calling-destination special number 700 of the telephone exchange 44#1 and the internal-line number 11 of the terminal 42#11 in the called-party-number information element, transmitting an ISDN-SETUP message with a call number CR1 to the gateway 46#2. Receiving the ISDN-SETUP message, the gateway 46#2 searches the calling-destination-gateway determination table 80 and the Internet-connection information table 82 for an IP address of a calling-destination gateway by using the calling-destination special number specified in the called-party-number information element of the ISDN-SETUP message.

For example, in this example, the calling-destination special number is 700. In this case, the IP address "000.000.000.001" of the gateway 46#1 is found in the search. Then, the gateway 46#2 transmits a SETUP message to the gateway 46#1 by using the IP address "000.000.000.001" of the gateway 46#1 in accordance with the H323 message procedure. Receiving the SETUP message, the gateway 46#1 edits an ALERT/CONN message before making a request for transmission to the signal channel. In this way, messages are transmitted to the gateway 46#2 one after another by way of the Internet 48. The gateway 46#2 recognizes the signal channel in a use. The gateway 46#2 also has an Internet-conversation-channel management table 84 for storing Internet-signal-channel numbers at a memory area corresponding to the call number CR1 of ISDN messages used as indexes. By this, it is indicated that the Internet-signal-channel is in a use.

The gateway 46#2 sets an ISDN-SETUP message received from the telephone exchange 44#2 in an information element newly added to an H323•Q931 user information message and transmits the message to the gateway 46#1 by using an already connected signal channel by way of the Internet 48. The gateway 46#1 extracts the ISDN-SETUP message set in the new information element of an H323•Q931 user information message, transmitting the ISDN-SETUP message to the telephone exchange 44#1. The telephone exchange 44#1 processes the incoming call for the terminal 42#11 indicated by the internal-line number 11 set in the ISDN-SETUP message. As the terminal 42#11 returns a response to an incoming call from the telephone exchange 44#1, the telephone exchange 44#1 connects the terminal 42#11 thereto, transmitting an ISDN-ALERT/CONN (call/response) message to the gateway 46#1 by using the same call number CR1 as the SETUP message. The gateway 46#1 sets the ISDN-ALERT/CONN (call/response) message received from the telephone exchange 44#1 in the new information element of the H323•Q931 user information message, transmitting the message to the gateway 46#2 by way of the Internet 48.

The gateway 46#2 fetches the ISDN-ALERT/CONN message set in the new information element of the H323•Q931 user information message received from the Internet 48 and sends the ISDN-ALERT/CONN message to the telephone exchange 44#2 to set a conversation state. By this, the gateway 46#2 recognizes that the call number CR1 is in a use. The gateway 46#2 opens an H245 channel and an audio channel, carrying out a communication to enable a conversation between the terminals 42#11 and 42#21. The gateway 46#2 stores the number of the audio channel in an entry of the Internet-conversation-channel management table 84 indicated by the call number CR1 of the ISDN message.

In order to make a transfer from the terminal 42#11 to the terminal 42#22 accommodated in the telephone exchange 44#2, the user of the terminal 42#11 does required operation such as pression of a transfer button and then dials the calling-destination special number 710 of the transfer-destination telephone exchange 44#2 and the internal-line number 22 of the terminal 42#22. Also in this case, a signal channel with a new call number CR2 is opened between the gateways 46#1 and 46#2 in the same way as the call made by the terminal 42#21 to the terminal 42#11. That is, receiving the ISDN-SETUP message, the gateway 46#1 searches the calling-destination-gateway determination table 80 and the Internet-connection information table 82 for an IP address of a calling-destination gateway by using the calling-destination special number specified in the called-party-number information element of the ISDN-SETUP message.

Then, the gateway 46#1 transmits a SETUP message to the gateway 46#2 by using the IP address of the gateway 46#2 in accordance with the H323 message procedure. Receiving the SETUP message, the gateway 46#2 edits an ALERT/CONN message before making a request for transmission to the signal channel. In this way, messages are transmitted to the gateway 46#1 one after another by way of the Internet 48. The gateway 46#1 recognizes the signal channel in a use. The gateway 46#1 also has an Internet-conversation-channel management table 84 storing Internet-signal-channel numbers at a memory area corresponding to the call number CR2 of ISDN messages used as indexes.

The gateway 46#1 sets an ISDN-SETUP message received from the telephone exchange 44#1 in an information element newly added to an H323•Q931 user information message and transmits the message to the gateway 46#2 by using an already connected signal channel by way of the Internet 48. The gateway 46#2 extracts the ISDN-SETUP message set in the new information element of an H323•Q931 user information message, transmitting the ISDN-SETUP message to the telephone exchange 44#2. The telephone exchange 44#2 processes the incoming call for the terminal 42#22 indicated by the internal-line number 11 set in the ISDN-SETUP message. As the terminal 42#22 returns a response to an incoming call from the telephone exchange 44#2, the telephone exchange 44#2 connects the terminal 42#22 thereto, transmitting an ISDN-ALERT/CONN (call/response) message to the gateway 46#2 by using the same call number CR2 as the SETUP message. The gateway 46#2 sets the ISDN-ALERT/CONN (call/response) message received from the telephone exchange 44#2 in the new information element of the H323•Q931 user information message, transmitting the message to the gateway 46#1 by way of the Internet 48.

The gateway 46#1 fetches the ISDN-ALERT/CONN message set in the new information element of the H323•Q931 user information message received from the Internet 48 and sends the ISDN-ALERT/CONN message to the telephone exchange 44#1 to set a conversation state. In this way, a conversation is under way between the terminals 42#11 and 42#22 through the gateway 46#1, the Internet 48 and the gateway 46#2. When the terminal 42#11 is put on a hook-on state, being cut off from the communication, according to the format shown in FIG. 15, the telephone exchange 44#1 transmits an ISDN-FACILITY message serving as a notice of a transfer destination to the gate way 46#1 by using the call number CR1 used in the conversation with the terminal 42#22. The gateway 46#1 edits a FACILITY message of the ISDN in the new information element of the H323•Q931 user information message and transmits the message by using the the signal channel corresponding to the call number CR1 of the ISDN-FACILITY message to the gateway 46#2. The gateway 46#2 transmits the ISDN-FACILITY message to the telephone exchange 44#2. The telephone exchange 44#2 transmits a FACILITY_ACK message of the ISDN to the gateway 46#2 by using the call number CR1 of the FACILITY message in response to the ISDN-FACILITY message. The gateway 46#2 in turn sets the FACILITY_ACK message of the ISDN in the new information element of the H323•Q931 user information message and transmits the message to the gateway 46#1. The gateway 46#1 transmits the FACILITY_ACK message of the ISDN to the telephone exchange 44#1.

Receiving the FACILITY_ACK message of the ISDN with the call number CR1, according to the format shown in FIG. 15, the telephone exchange 44#1 transmits an ISDN-FACILITY message serving as a request for routing optimization to the gateway 46#1 by using the call number CR1. The gateway 46#1 sets the ISDN-FACILITY message serving as a request in the new information element of the H323•Q931 user information message, transmitting the message to the gateway 46#2. The gateway 46#2 transmits the ISDN-FACILITY message serving as a request to the telephone exchange 44#2. Receiving the ISDN-FACILITY message of the call number CR1 serving as a request for routing optimization, the telephone exchange 44#2 carries out a routing optimization to switch the path between the terminal 42#21 and the terminal #42#11 to a path between the terminal 42#21 and the terminal 42#22, allowing a conversation to be held between the terminals 42#21 and 42#22 through a path set inside the telephone exchange 44#2. This switching can be done because the call number CR1 is originally set for a message transmitted from the terminal 42#21 to the terminal 42#11 and the transfer notice is a request for a transfer to the terminal 42#22. Thus, the quality of the sound by no means deteriorates. When carrying out the routing optimization, the telephone exchange 44#2 transmits a FACILITY_ACK message of the ISDN to the gateway 46#2 which passes on the message to the telephone exchange 44#1 by way of the Internet 48 and the gateway 46#1.

The telephone exchange 44#1 transmits an ISDN-DISC message to request that the line of the call number CR1 be released to the gateway 46#1. The gateway 46#1 sets the DISC message in the new information element of the H323•Q931 user information message and transmits the message to the gateway 46#2 by using the signal channel corresponding to the call number CR1. The gateway 46#2 transmits the DISC message to the telephone exchange 44#2. As shown in FIG. 12, the telephone exchange 44#2 transmits an ISDN-REL message to the telephone exchange 44#1 by way of the gateway 46#1, the Internet 48 and the gateway 46#2. The telephone exchange 44#1 transmits a REL_COMP message to the telephone exchange 44#2 by way of the gateway 46#2, the Internet 48 and the gateway 46#1 in response to the ISDN-REL message. The telephone exchanges 44#1 and 44#2 release the conversation channel of the call number CR1. Receiving the ISDN-REL_COMP message set in the new information element of the H323•Q931 user information message from the gateway 46#1, the gateway 46#2 searches the Internet-conversation-channel management table 84 for numbers of a signal channel and an audio channel by using the call number CR1 as a key and releases the signal and audio channels.

By the same token, the telephone exchanges 44#1 and 44#2 as well as the gateways 46#1 and 46#2 release the signal and audio channels for the call number CR2. As a result, the path from the telephone exchange 44#2 to the terminal 42#11 is switched to an optimum path between the terminals 42#21 and 42#22 in the telephone exchange 44#2, and the path between the terminals 42#21 and 42#11 as well as the paths between the terminals 42#11 and 42#22 are released as shown in FIG. 13. For this reason, the quality of the sound can be prevented from deteriorating. Further resources such as signal channels, audio channels used for communicating between the telephone exchange 44#1 and gateway 46#1, between the gateway 46#1 and gateway 46#2, and between the gateway 46#2 and the telephone exchange 44#2, relates the call number CR1, CR2, is not used wastefully. Further, in a packet network such as Internet, because transmission and receipt of packets between gateways is stopped by the release of channels, traffic is restrained and traffic overflow is avoided. Still further, in case of a charge by connection time, communication cost can be reduced.

Second Embodiment

FIG. 16 is a diagram showing the configuration of a gateway 100#i implemented by a second embodiment of the present invention. Elements of the second embodiment which are substantially identical with those of the first embodiment shown in FIG. 5 are denoted by the same reference numeral as the latter. The gateway 100#i shown in FIG. 16 is different from the gateway 46#i shown in FIG. 5 in that: the function to set an ISDN message in the new information element of the H323•Q931 user information message is eliminated from the ISDN-message-transfer control unit 92; a call control unit 90 controls a audio channel control unit 72 and a ISDN-message-transfer unit 92 for transmitting and receiving an ISDN message; the channel for setting an ISDN message is an audio channel instead of a signal channel; and the number of an audio channel for transmitting and receiving an ISDN message is added to an Internet-conversation-channel management table 94.

A call control unit 90 employed in the second embodiment is different from the call control unit 64 of the first embodiment shown in FIG. 5 in that the former does not set an ISDN message received from the telephone exchange 44#i employed in the Internet-telephony gateway system shown in FIG. 2 in the new information element of an H323•Q931 user information message. Instead, the call control unit 90 controls the audio channel control unit 72 and the ISDN-message-transfer unit 92 for opening an audio channel and for transmitting and receiving an ISDN message, setting the ISDN message on the audio channel and transmits the message to the Internet 48. In addition, as shown in FIG. 16, the Internet-conversation-channel management table 94 is used for storing numbers of Internet audio channels for transmitting and receiving ISDN messages besides numbers of signal channels and audio channels for conversations as described above. Another different from the call control unit 64 of the first embodiment shown in FIG. 5 is that the CODEC control is not executed for an audio channel for transmitting and receiving an ISDN message. A media type of audio channel for transmitting and receiving ISDN messages is typically data. By this, transmission and receipt of ISDN messages is can be done.

Figure 17:
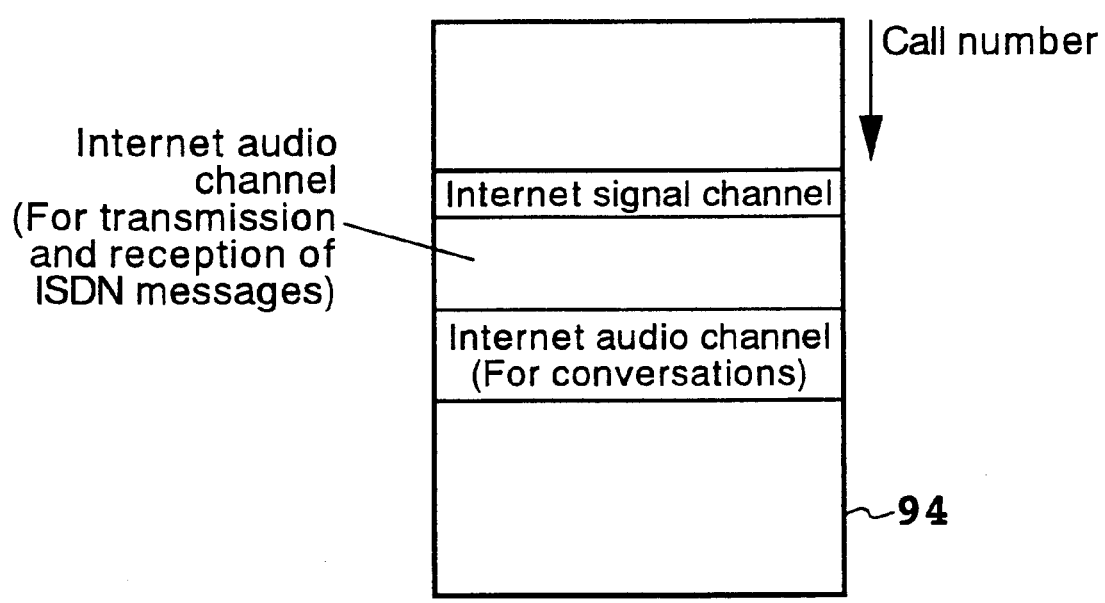
FIG. 17 is a diagram showing the structure of an Internet-conversation-channel management table employed in the configuration of the gateway shown in FIG. 14.

FIG. 17 is a diagram showing the structure of the Internet-conversation-channel management table 94 employed in the configuration of the gateway shown in FIG. 16. As shown in the figure, in the Internet-conversation-channel management table 94 is stored an array of elements each comprising numbers of an Internet audio channel for transmitting and receiving ISDN messages, an Internet signal channel and an audio channel for conversations at a memory area corresponding to the call number used as a subscript (an index) of the element. The call number is a call number set in an ISDN-SETUP message.

Figure 18:
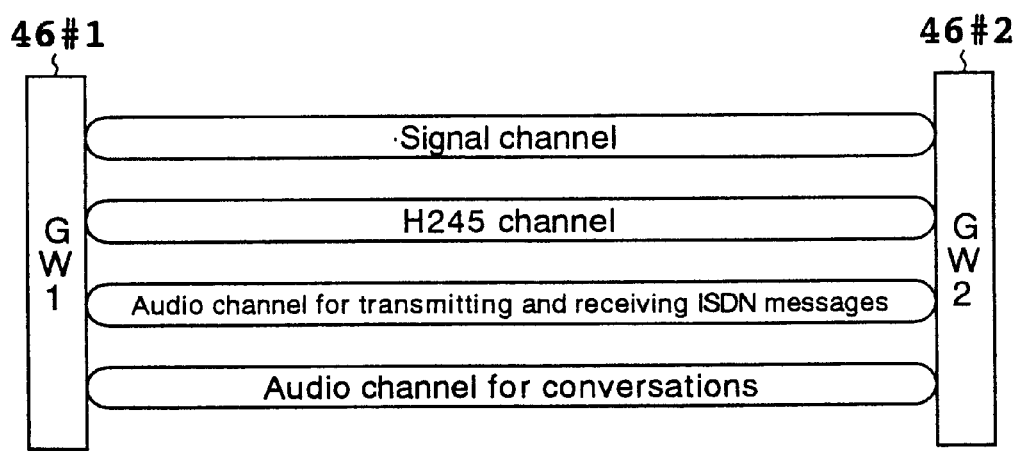
FIG. 18 is a diagram showing an H323 channel provided by the second embodiment.
Figure 19:
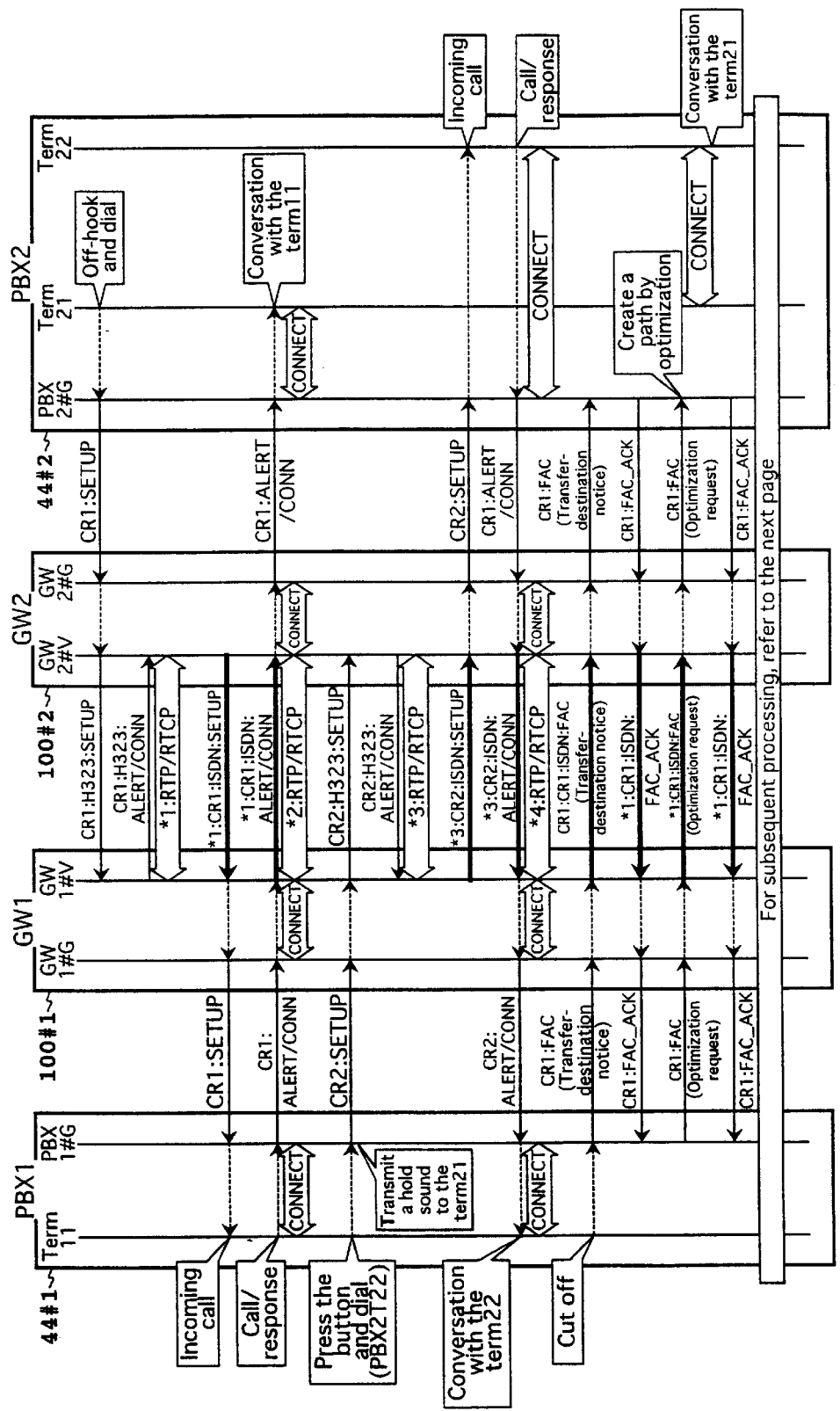
FIG. 19 is a diagram showing a message sequence provided by the second embodiment of the present invention.
Figure 20:
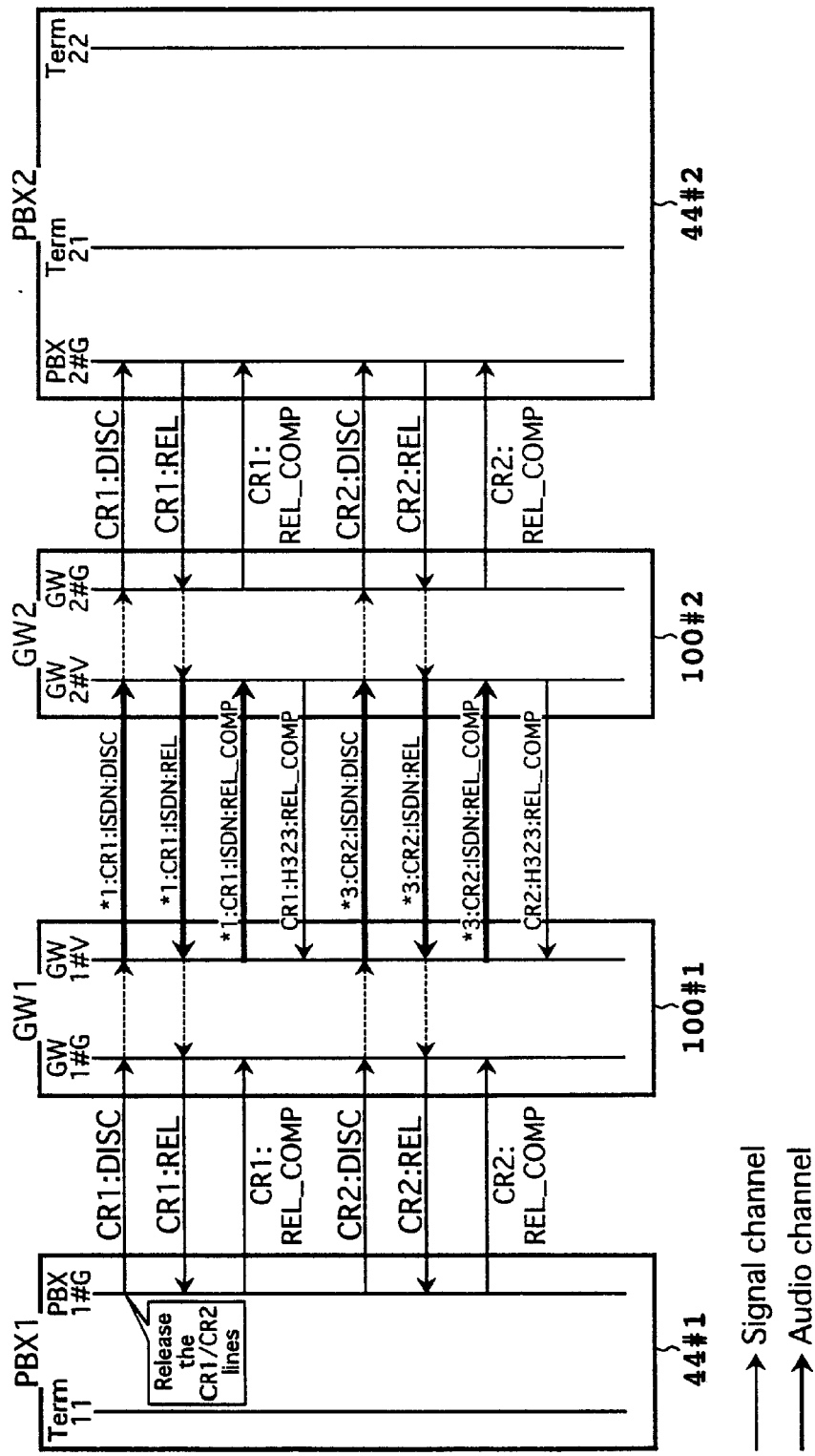
FIG. 20 is a diagram showing a message sequence provided by the second embodiment of the present invention.

FIG. 18 is a diagram showing an H323 channel provided by the second embodiment and used for communication. As shown in the figure, an H323 channel provided by the second embodiment comprises a signal channel, an H245 channel, an audio channel for transmitting and receiving ISDN messages and an audio channel for conversations. FIGS. 19 and 20 are each a diagram showing a message sequence of the Internet-telephony gateway system provided by the second embodiment of the present invention. The following description explains the operation of the Internet-telephony gateway system provided by the second embodiment by referring to these figures.

In this embodiment, as an example, the terminal 42#21 accommodated in the telephone exchange 44#2 makes a call to the terminal 42#11 accommodated in the telephone exchange 44#1. Then, in the course of a conversation between the terminals 42#21 and 42#11, the user of the terminal 42#11 presses the transfer button to make a call to the terminal 42#22 accommodated in the telephone exchange 44#2 and a transfer thereto. As shown in FIG. 19, when the number of the terminal 42#11 is dialed by the user of the terminal 42#21 accommodated in the telephone exchange 44#2, the telephone exchange 44#2 transmits an ISDN-SETUP message to the gateway 100#2. The gateway 100#2 Judges the gateway 100#1 to be the Internet called destination from the called-party-number information element of the ISDN-SETUP message, and a signal channel with a signal-channel number of typically 1 at a call number CR1 between the gateways 100#1 and 100#2 is put in a state of connection in accordance with the H323 message procedure. By using the H245 channel, the type of the media is determined, and the H245 channel is put in a state of connection. By RTP/RTCP communication, an audio channel with an audio-channel number of typically 1 for transmitting and receiving ISDN messages is opened and put in a state of connection. The gateways 100#1 and 100#2 each store the numbers of the signal channel and the audio channel for transmitting and receiving ISDN messages in an entry of the Internet-conversation-channel management table 94 indicated by the call number CR1 put in a state of connection. The gateway 100#2 sets the ISDN-SETUP message received from the telephone exchange 44#2 in the audio channel for transmitting and receiving ISDN messages and transmits the message to the gateway 100#1. The gateway 100#1 passes on the ISDN-SETUP message received from the gateway 100#2 to the telephone exchange 44#1. The telephone exchange 44#1 determines the terminal 42#11 to be a called terminal on the basis of information included in the called-party-number information element of the ISDN-SETUP message.

The gateway 100#1 transmits an ISDN-ALERT/CONN message received from the telephone exchange 44#1 to the gateway 100#2 through a channel for transmitting and receiving ISDN messages. The gateway 100#2 passes on the ISDN-ALERT/CONN message received from the gateway 100#1 to the telephone exchange 44#2. The gateway 100#2 opens an audio channel through RTP/RTCP communications with the gateway 100#1, making a conversation between the terminal 42#21 and 42#11 possible. The gateway 100#2 stores the number of the audio channel in an entry of the Internet-conversation-channel management table 94 indicated by the signal-channel number corresponding to the call number CR1. As described earlier, the Internet-conversation-channel management table 94 is an array of elements with the signal-channel number serving as an index of the elements. As an example, the number of the audio channel is 2.

In the course of the conversation, the user of the terminal 42#11 presses the transfer button and dials a calling-destination special number of 710 and an internal-line number of 22 in order to make a transfer to the terminal 42#22. In this case, the telephone exchange 44#1 transmits a hold sound to the terminal 42#21 and an ISDN-SETUP message to the gateway 100#1.

The gateway 100#1 puts a signal channel, an H245 channel and an audio channel for transmitting and receiving ISDN messages in a connected state in accordance with the H323 message procedure in the same way as what was described earlier. The gateway 100#1 stores the number of the signal channel and the number of the audio channel for transmitting and receiving ISDN messages in the Internet-conversation-channel management table 94. As an example, the number of the signal channel is 2 and the number of the audio channel is 4. The gateway 100#1 transmits and receives ISDN messages by using the audio channel for transmitting and receiving ISDN messages to open an audio channel for a conversation between the terminals 42#11 and 42#22. RTP/RTCP communications between the gateways 100#1 and 100#2 are carried out to make a conversation between the terminal 42#22 and 42#11 possible. The gateway 100#1 stores the number of the audio channel in the Internet-conversation-channel management table 94.

When the terminal 42#11 is cut off from the communication, the telephone exchange 44#1 transmits an ISDN-FACILITY message serving as a notice of a transfer destination to the gateway 100#1 by using the call number CR1 set between the terminals 42#11 and 42#21. The gateway 100#1 sets an ISDN-FACILITY message serving as a transfer notice on a channel for transmitting and receiving ISDN messages associated with the call number CR1 and transmits the message to the gateway 100#2. The gateway 100#2 passes on the ISDN-FACILITY message serving as a transfer notice to the telephone exchange 44#2. The telephone exchanges 44#1 and 44#2 then execute a sequence of transmission and reception of an ISDN-FACILITY message serving as a notice of a transfer destination, an ISDN-FACILITY_ACK message serving as an acknowledgment of the notice of a transfer destination and an ISDN-FACILITY message serving as a request for routing optimization while the gateways 100#1 and 100#2 exchange these ISDN messages by using the audio channel for transmitting and receiving ISDN messages. Receiving the ISDN-FACILITY message serving as the request for routing optimization, the telephone exchange 44#2 carries out existing routing optimization processing and processing to connect the terminal 42#21 to the terminal 42#22.

Then, the telephone exchanges 44#1 and 44#2 execute a sequence of transmission and reception of an ISDN-DISC message, an ISDN-REL message and an ISDN-REL_

COMP message by using the call number CR1 while the gateways 100#1 and 100#2 exchange these ISDN messages by using the audio channel for transmitting and receiving ISDN messages of a signal channel associated with the call number CR1.

Receiving the ISDN-REL_COMP message, the gateway 100#2 searches the Internet-conversation-channel management table 94 for a signal channel, an H245 channel and 2 audio channels associated with the call number CR1 and releases these channels. By the same token, the gateway 100#2 searches the Internet-conversation-channel management table 94 for a signal channel, an H245 channel and 2 audio channels associated with the call number CR2 and releases these channels.

Third Embodiment

Figure 21:
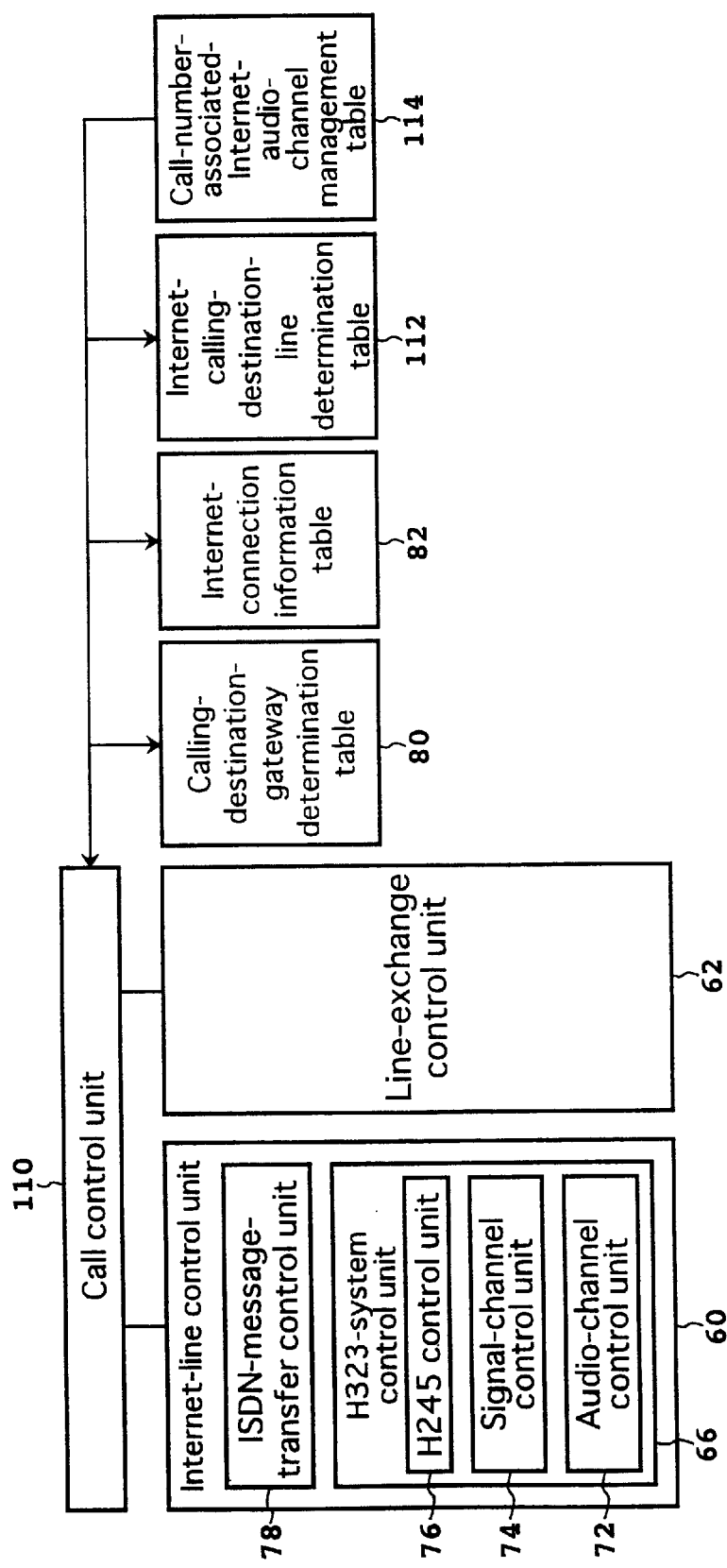
FIG. 21 is a diagram showing the configuration of a gateway implemented by a third embodiment of the present invention.

FIG. 21 is a diagram showing the configuration of a gateway implemented by a third embodiment of the present invention. Configuration elements virtually identical with those employed in the first embodiment shown in FIG. 5 are denoted by the same reference numerals as the latter. In the Internet-telephony gateway system shown in FIG. 2, the gateway implemented by the first embodiment is denoted by reference numeral 46#i. To distinguish the gateway implemented by the third embodiment from the gateway implemented by the first embodiment, let reference numeral 109#i denotes the former. The gateway 109#i shown in FIG. 21 is the same as the gateway 46#i shown in FIG. 5 as far as the setting of an ISDN message received from the telephone exchange 44#i in the new information element of the H323•Q931 user information message of a signal channel is concerned. The gateway 109#i is different from the gateway 46#i shown in FIG. 5, however, in that the signal channel is opened at a build-up time of the gateway 109#i and, when the conversation is ended, only the audio channel for a conversation is released. The differences are described in detail as follows.

(1) A call control unit 110 employed in the gateway 109#i shown in FIG. 21 is different from the call control unit 64 employed in the gateway 46#i shown in FIG. 5 in that, when the gateway 109#i is built up, the call control unit 110 controls an Internet-line control unit 60 so that signal channels are opened to all other gateways 109#j, where j≠i, which constitute the Internet-telephony gateway system in accordance with the H323•Q931 message procedure.

(2) In addition, the call control unit 110 employed in the gateway 109#i shown in FIG. 21 is also different from the call control unit 64 employed in the gateway 46#i shown in FIG. 5 in that the numbers of the opened signal channels are cataloged in an Internet-calling-destination-line determination table 112.

(3) Furthermore, the call control unit 110 employed in the gateway 109#i shown in FIG. 21 is also different from the call control unit 64 employed in the gateway 46#i shown in FIG. 5 in that, when an ISDN-SETUP message is received from a gateway 109#j, an Internet audio channel is opened and the number of the opened Internet audio channel is cataloged in a call-number-associated-Internet-audio-channel management table 114.

(4) Moreover, the call control unit 110 employed in the gateway 109#i shown in FIG. 21 is also different from the call control unit 64 employed in the gateway 46#i shown in FIG. 5 in that, when a terminal 42#ij is cut off from communication, only an audio channel for a conversation is released.

Figure 22:
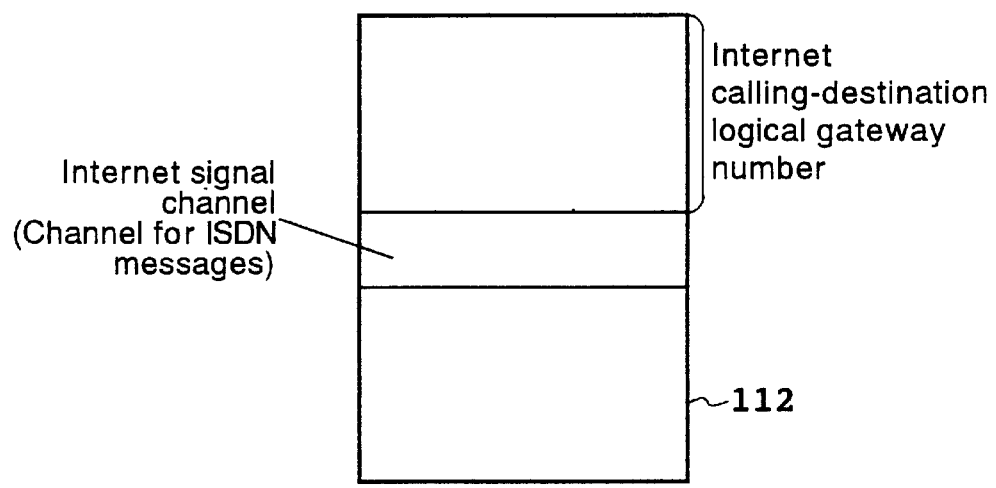
FIG. 22 is a diagram showing the structure of an Internet-calling-destination-line determination table employed in the configuration of the gateway shown in FIG. 21.
Figure 23:
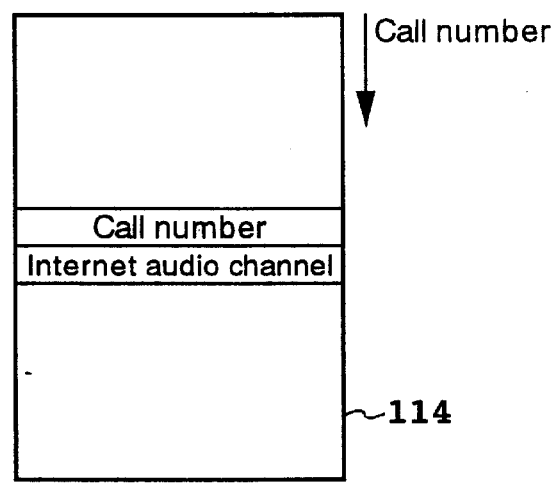
FIG. 23 is a diagram showing the structure of a call-number-associated-Internet-audio-channel management table employed in the configuration of the gateway shown in FIG. 21.

FIG. 22 is a diagram showing the structure of the Internet-calling-destination-line determination table 112 employed in the configuration of the gateway 109#i shown in FIG. 21. As shown in FIG. 22, in the Internet-calling-destination-line determination table 112 is stored an array of numbers of Internet signal channels at a memory area corresponding to the logical gateway numbers of Internet calling destinations used as indexes of the Internet-signal-channel numbers. FIG. 23 is a diagram showing the structure of the call-number-associated-Internet-audio-channel management table 114 employed in the configuration of the gateway 109#i shown in FIG. 21. As shown in FIG. 23, in the call-number-associated-Internet-audio-channel management table 114 is stored an array of numbers of Internet audio channels at a memory area corresponding to call numbers used as indexes of the Internet-audio-channel numbers. The call number is a number set in an ISDN-SETUP message.

The operation of the gateway 109#i shown in FIG. 21 is explained as follows. In the gateway 109#i, the logical gateway numbers and the IP addresses of Internet calling destinations for all other gateways 109#j, where j≠i, which constitute the Internet-telephony gateway system, are entered via a maintenance console to be cataloged in an Internet-connection-information table 82. By the same token, the calling-destination special numbers of telephone exchanges accommodating terminals and the logical gateway numbers of Internet calling destinations for all other gateways 109#j are entered via the maintenance console to be cataloged in a calling-destination-gateway determination table 80. After the logical gateway numbers and the IP addresses of Internet calling destinations are cataloged in the Internet-connection information table 82 and the calling-destination special numbers of telephone exchanges accommodating terminals and the logical gateway numbers of Internet calling destinations are cataloged in the calling-destination-gateway determination table 80 when the Internet-telephony gateway system is built up, the gateway 109#i opens a signal channel with a number of typically 1 for transmission and reception of ISDN messages to and from each of the gateways 109#j whose IP addresses have been cataloged in the Internet-connection information table 82 and puts the signal channel in a connected state by following the H323•Q931 message procedure. Then, the gateway 109#i catalogs the number of each of the Internet signal channels, which is 1 in this example, in an entry of the Internet-calling-destination-line determination table 112 indicated by the logical gateway number of the Internet calling destination of the gateway 109#j serving as an index.

Figure 24:
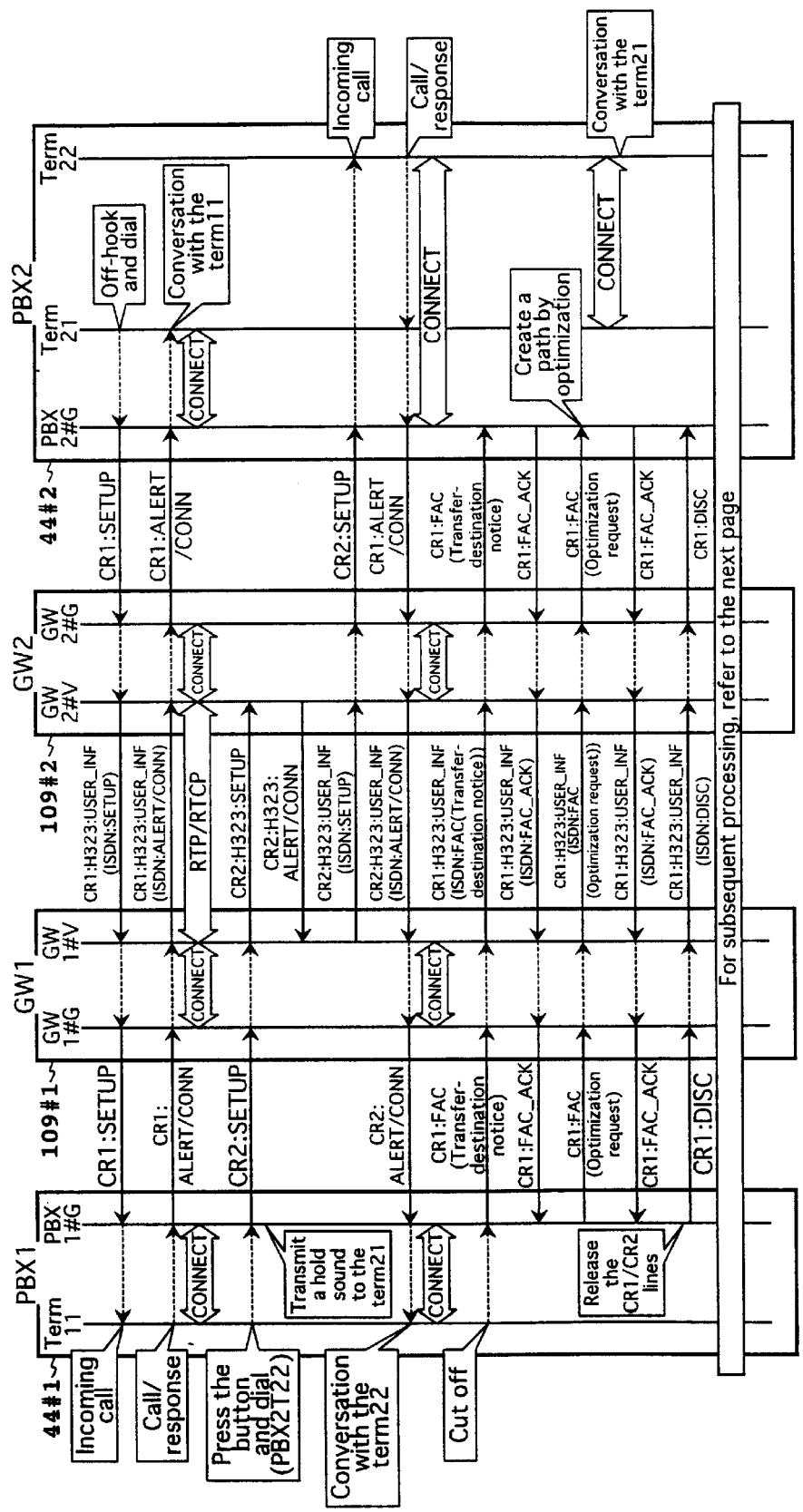
FIG. 24 is a diagram showing a message sequence provided by the third embodiment of the present invention.
Figure 25:
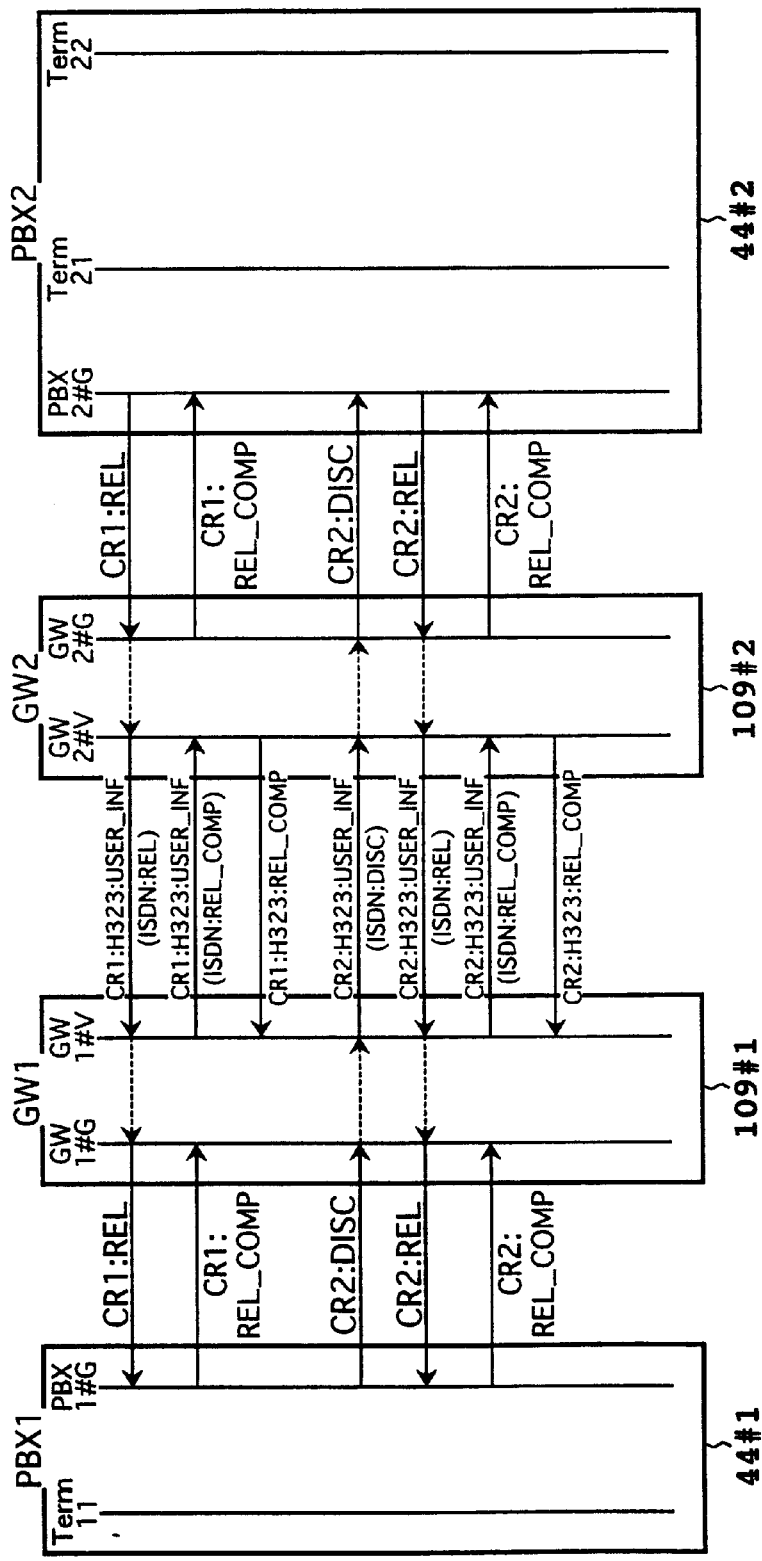
FIG. 25 is a diagram showing a message sequence provided by the third embodiment of the present invention.

FIGS. 24 and 25 are each a diagram showing a message sequence provided by the third embodiment of the present invention. As shown in FIG. 24, the user of the terminal 42#21 dials a calling-destination special number of 700 and the number 11 of the terminal 42#11 to make a call thereto. The telephone exchange 44#2 then transmits an ISDN-SETUP message to the gateway 109#2. Receiving the ISDN-SETUP message, the gateway 109#2 searches the calling-destination-gateway determination table 80 for the Internet logical gateway number of the gateway 109#1 connected to the telephone exchange 44#1 indicated by the calling-destination special number specified in the called-party-number information element of the ISDN-SETUP message. In this example, the Internet logical gateway number is 1. The gateway 109#2 then searches the Internet-connection information table 82 for an IP address associated with the Internet logical gateway number found in the search of the calling-destination-gateway determination table 80. The gateway 109#2 further searches the Internet-calling-destination-line determination table 112 for the number of a signal channel for transmitting and receiving ISDN messages indicated by the Internet logical gateway number found in the search of the calling-destination-gateway determination table 80. Subsequently, the gateway 109#2 sets the ISDN-SETUP message received from the telephone exchange 42#2 in the new information element of the H323•Q931 user information message and transmits the ISDN-SETUP message to the gateway 109#1 by using the signal channel for transmitting and receiving ISDN messages indicated by the number found in the search of the Internet-calling-destination-line determination table 112.

The gateway 109#1 passes on the ISDN-SETUP message set in the new information element of the H323•Q931 user information message to the telephone exchange 44#1. As the terminal 42#11 returns a response to an incoming call from the telephone exchange 44#1, the telephone exchange 44#1 connects the terminal 42#11 thereto, transmitting an ISDN-ALERT/CONN (call/response) message to the gateway 109#1. The gateway 109#1 sets the ISDN-ALERT/CONN (call/response) message received from the telephone exchange 44#1 in the new information element of the H323•Q931 user information message of the signal channel for transmitting and receiving ISDN messages, transmitting the message to the gateway 109#2. The gateway 109#2 transmits the ISDN-ALERT/CONN message received through the signal channel to the telephone exchange 44#2. In addition, when a CONN message is received, an audio channel with a number of typically 2 is opened for a conversation, allowing the conversation to be held between the gateways 109#1 and 109#2.

At that time, the gateway 109#2 stores the number of the audio channel for a conversation in an entry of the call-number-associated-Internet-audio-channel management table 114 indicated by the call number CR1 of the ISDN message which is used as an index. In this way, since a signal channel is not opened each time a call is made from the telephone exchange 44#2, the sequence becomes simpler and a plurality of audio channels can be controlled by using 1 signal channel for transmitting and receiving ISDN messages.

In order to make a transfer from the terminal 42#11 to the terminal 42#22 in the course of the conversation, the transfer button is pressed and transfer destination numbers of 710 and 22 are dialed at the terminal 42#11. Then, ISDN messages each set in the new information element of the H323•Q931 user information message of the signal channel for transmitting and receiving ISDN messages opened by the gateway 109#1 are exchanged to open an audio channel between the terminals 42#11 and 42#22. The number of the audio channel is then stored in an entry of the call-number-associated-Internet-audio-channel management table 114 indicated by the call number CR2 which serves as an index. As the terminal 42#11 is cut off from the communication, the telephone exchanges 44#1 and 44#2 execute a sequence of transmission and reception of an ISDN-FACILITY message serving as a notice of a transfer destination, an ISDN-FACILITY_ACK message serving as an acknowledgment of the notice of a transfer destination, an ISDN-FACILITY message serving as a request for routing optimization and an ISDN-FACILITY_ACK message. During this sequence, the gateways 109#1 and 109#2 exchange these ISDN messages which are each set in the new information element of the H323•Q931 user information message of the signal channel. Receiving the ISDN-FACILITY message serving as the request for routing optimization, the telephone exchange 44#2 carries out existing routing optimization processing and processing to connect the terminal 42#21 to the terminal 42#22.

Then, the telephone exchanges 44#1 and 44#2 execute a sequence of transmission and reception of an ISDN-DISC message of the signal channel, an ISDN-REL message and an ISDN-REL_COMP message by using the call number CR1. As shown in FIG. 25, during this sequence, the gateways 109#1 and 109#2 exchange these ISDN messages which are each set in the new information element of the H323•Q931 user information message of the signal channel. Receiving the ISDN-REL_COMP message, the gateway 109#2 searches the call-number-associated-Internet-audio-channel management table 114 for an audio channel associated with the call number CR1 and releases the audio channel. The call between the gateways 109#1 and 109#2 is released in accordance with the ISDN-message procedure. Likewise, the gateway 109#2 searches the call-number-associated-Internet-audio-channel management table 114 for an audio channel associated with the call number CR2 and releases the audio channel in the same sequence. All signal channels for transmitting and receiving ISDN messages with the channel numbers thereof cataloged in the Internet-calling-destination-line determination table 112 are released in accordance with the H323 message procedure at the end of the operation of the gateway 109#i.

Fourth Embodiment

Figure 26:
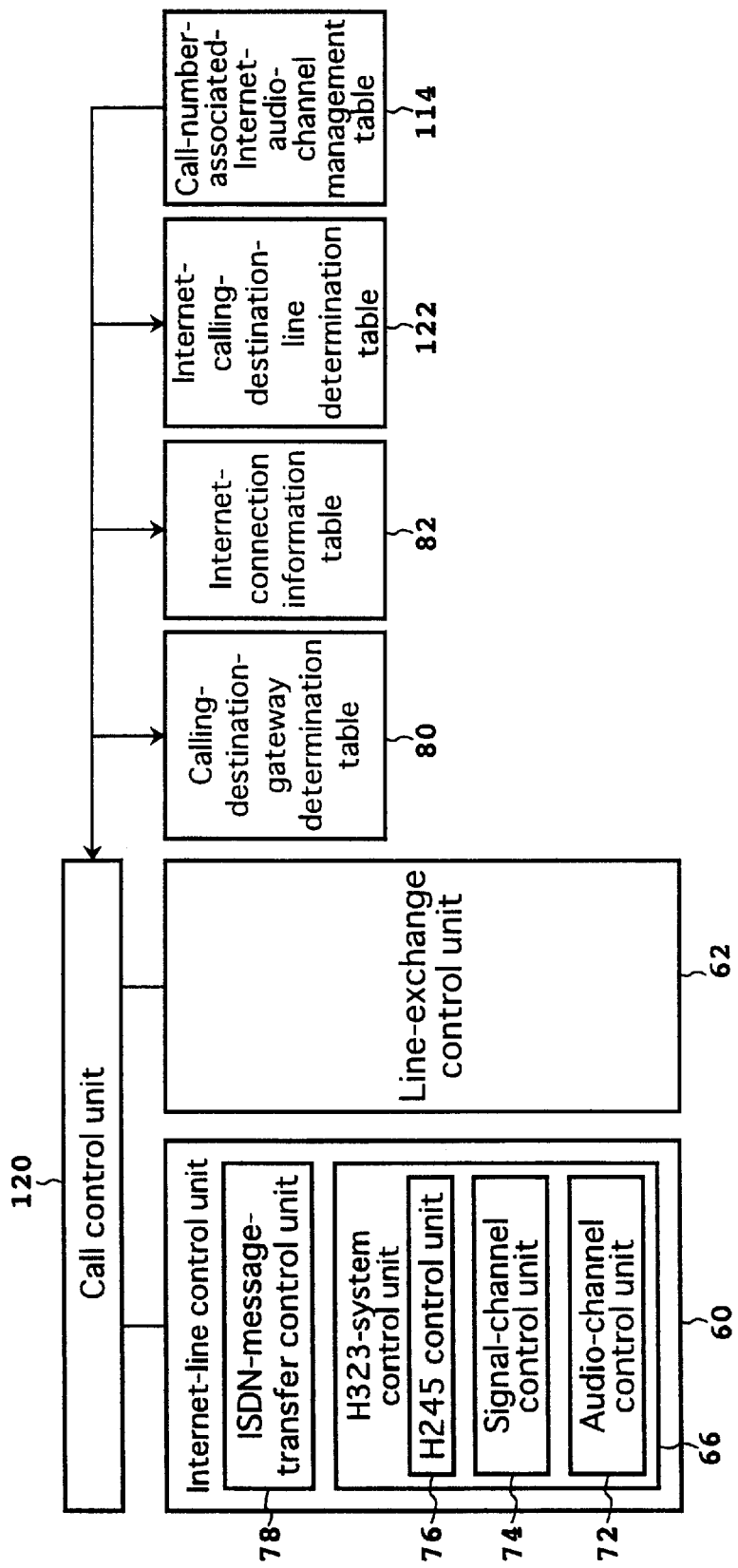
FIG. 26 is a diagram showing the configuration of a gateway implemented by a fourth embodiment of the present invention.

FIG. 26 is a diagram showing the configuration of a gateway implemented by a fourth embodiment of the present invention. Configuration elements virtually identical with those employed in the second embodiment shown in FIG. 16 are denoted by the same reference numerals as the latter. In the Internet-telephony gateway system shown in FIG. 2, the gateway implemented by the first embodiment is denoted by reference numeral 46#i. To distinguish the gateway implemented by the fourth embodiment from the gateway 46#i implemented by the first embodiment and the gateway 100#i implemented by the second embodiment, let reference numeral 119#i denote the former. The gateway 119#i shown in FIG. 26 is the same as the gateway 100#i shown in FIG. 16 as far as the setting of an ISDN message received from the telephone exchange 44#i in an audio channel for transmitting and receiving ISDN messages is concerned. The gateway 119#i is different from the gateway 100#i shown in FIG. 16, however, in that the audio channel for transmitting and receiving ISDN messages is opened at a build-up time of the gateway 119#i and, when a conversation is ended, only the audio channel for a conversation is released. The differences are described in detail as follows.

(1) A call control unit 120 employed in the gateway 119#i shown in FIG. 26 is different from the call control unit 90 employed in the gateway 100#i shown in FIG. 16 in that, when the gateway 119#i is built up, the call control unit 120 controls an Internet-line control unit 60 so that signal channels, H245 channels and audio channels for transmitting and receiving ISDN messages are opened to all other gateways 109#j, where j≠i, which constitute the Internet-telephony gateway system and put in a connected state in accordance with the H323 message procedure.

(2) In addition, the call control unit 120 employed in the gateway 119#i shown in FIG. 26 is also different from the call control unit 90 employed in the gateway 100#i shown in FIG. 16 in that the numbers of the opened signal channels, the opened H245 channels and the opened audio channels for transmitting and receiving ISDN messages are cataloged in an Internet-calling-destination-line determination table 122.

(3) Furthermore, the call control unit 120 employed in the gateway 119#i shown in FIG. 26 is also different from the call control unit 90 employed in the gateway 100#i shown in FIG. 14 in that, when an ISDN-SETUP message is received from a gateway 119#j, an Internet audio channel is opened and the number of the opened Internet audio channel is cataloged in a call-number-associated-Internet-audio-channel management table 114.

(4) Moreover, the call control unit 120 employed in the gateway 119#i shown in FIG. 26 is also different from the call control unit 90 employed in the gateway 100#i shown in FIG. 14 in that, when a terminal 42#ij is cut off from communication, only an audio channel for a conversation is released.

Figure 27:
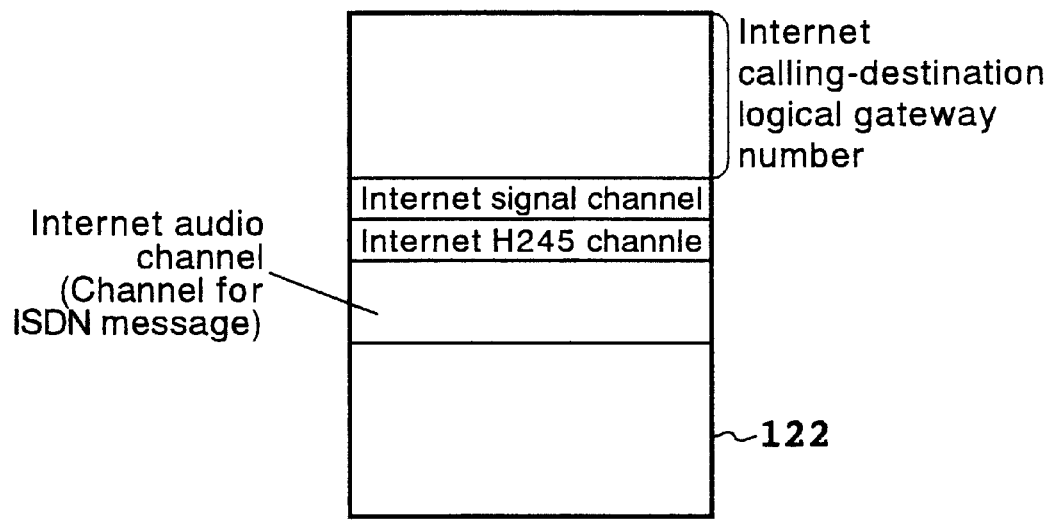
FIG. 27 is a diagram showing the structure of an Internet-calling-destination-line determination table employed in the configuration of the gateway shown in FIG. 26.

FIG. 27 is a diagram showing the structure of the Internet-calling-destination-line determination table 122 employed in the configuration of the gateway 119#i shown in FIG. 26. As shown in FIG. 27, in the Internet-calling-destination-line determination table 122 is stored an array of elements each comprising the numbers of an Internet signal channel, an Internet H245 channel and an Internet audio channel at a memory area corresponding to with logical gateway numbers of Internet calling destinations used as indexes of the elements.

The operation of the gateway 119#i shown in FIG. 26 is explained as follows. In the gateway 119#i, the logical gateway numbers and the IP addresses of Internet calling destinations for all other gateways 119#j, where j≠i, which constitute the Internet-telephony gateway system, are entered via a maintenance console to be cataloged in an Internet-connection-information table 82. By the same token, the calling-destination special numbers of telephone exchanges accommodating terminals and the logical gateway numbers of Internet calling destinations for all other gateways 119#j are entered via the maintenance console to be cataloged in a calling-destination-gateway determination table 80. After the logical gateway numbers and the IP addresses of Internet calling destinations are cataloged in the Internet-connection information table 82 and the calling-destination special numbers of telephone exchanges accommodating terminals and the logical gateway numbers of Internet calling destinations are cataloged in the calling-destination-gateway determination table 80 when the Internet-telephony gateway system is built up, the gateway 119#i opens a signal channel with a number of typically 1, an H245 channel and an audio channel for transmitting and receiving ISDN messages to and from each of the gateways 119#j whose IP addresses have been cataloged in the Internet-connection information table 82 and puts the signal channel in a connected state by following the H323•Q931 message procedure.

Then, the gateway 119#i catalogs the numbers of the Internet signal channel, an H245 channel and an audio channel in an entry of the Internet-calling-destination-line determination table 122 indicated by the logical gateway number of each Internet calling destination of the gateway 119#j serving as an index.

Figure 28:
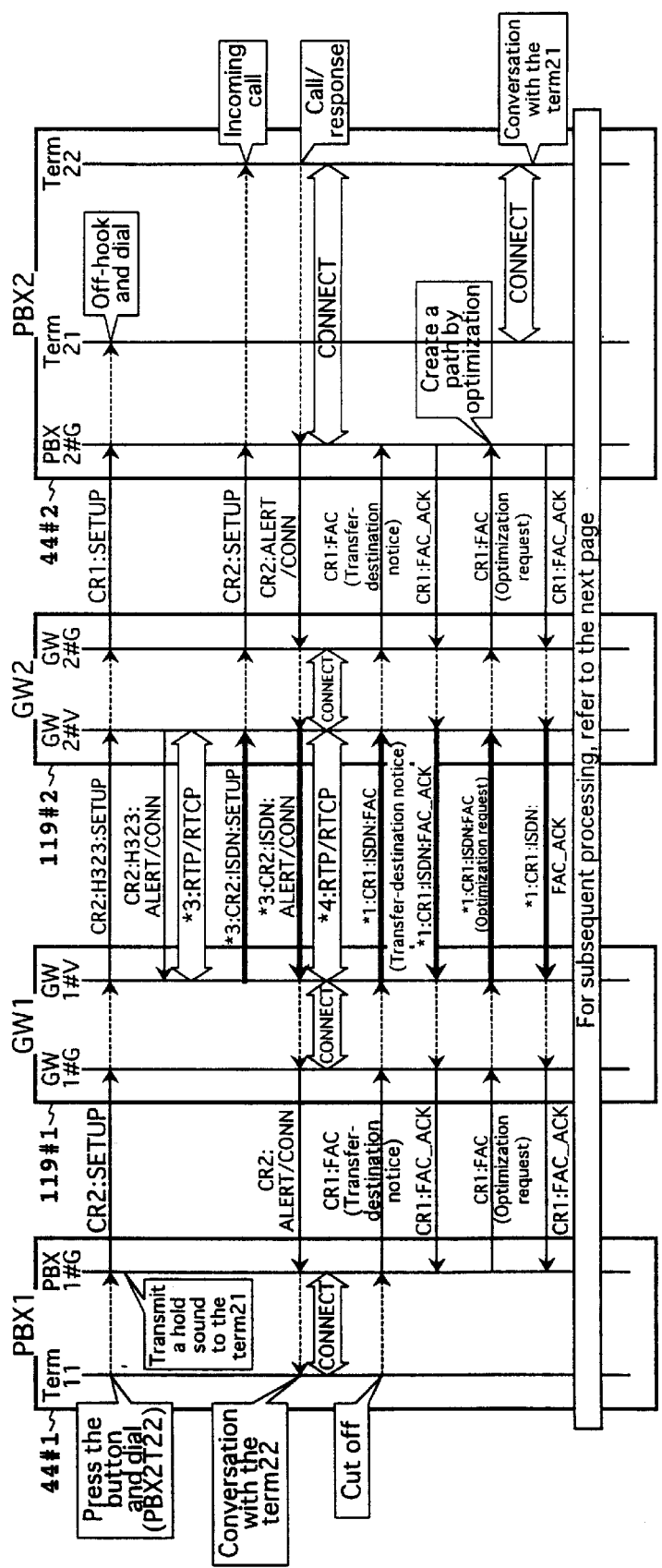
FIG. 28 is a diagram showing a message sequence provided by the fourth embodiment of the present invention.
Figure 29:
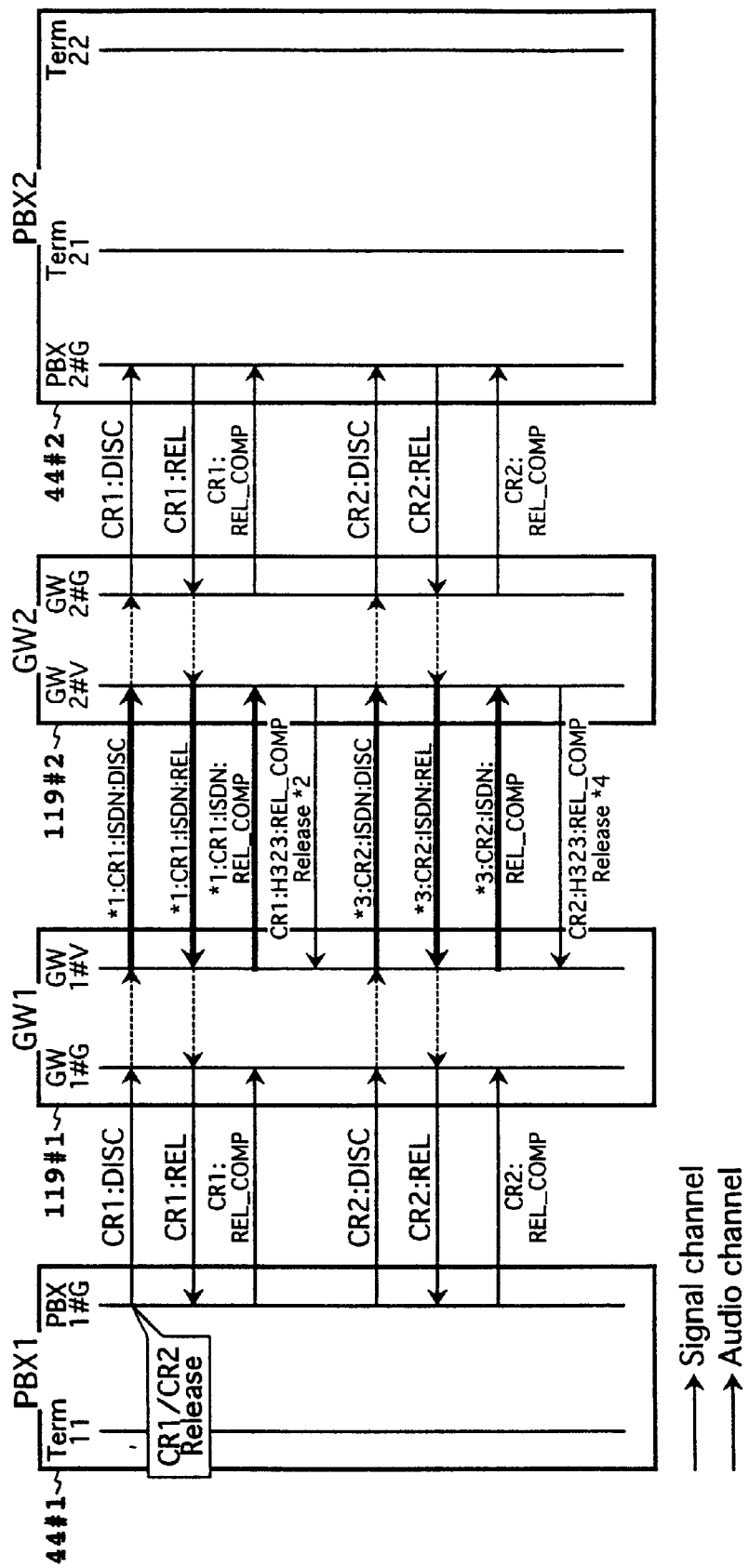
FIG. 29 is a diagram showing a message sequence provided by the fourth embodiment of the present invention.

FIGS. 28 and 29 are each a diagram showing a message sequence provided by the fourth embodiment of the present invention. As shown in FIG. 28, the user of the terminal 42#21 dials a calling-destination special number of 700 and the number 11 of the terminal 42#11 to make a call thereto. The telephone exchange 44#2 then transmits an ISDN-SETUP message to the gateway 119#2. Receiving the ISDN-SETUP message, the gateway 119#2 searches the calling-destination-gateway determination table 80 for the Internet logical gateway number of the gateway 119#1 connected to the telephone exchange 44#1 indicated by the calling-destination special number specified in the called-party-number information element of the ISDN-SETUP message. In this example, the Internet logical gateway number is 1. The gateway 119#2 then searches the Internet-connection information table 82 for an IP address associated with the Internet logical gateway number found in the search of the calling-destination-gateway determination table 80. The gateway 119#2 further searches the Internet-calling-destination-line determination table 122 for the number of an audio channel for transmitting and receiving ISDN messages indicated by the Internet logical gateway number found in the search of the calling-destination-gateway determination table 80.

Subsequently, the gateway 119#2 transmits the ISDN-SETUP message to the gateway 119#1 by using the audio channel for transmitting and receiving ISDN messages indicated by the number found in the search of the Internet-calling-destination-line determination table 122. The gateway 119#1 passes on the ISDN-SETUP message received through the audio channel for transmitting and receiving ISDN messages to the telephone exchange 44#1. As the terminal 42#11 returns a response to an incoming call from the telephone exchange 44#1, the telephone exchange 44#1 connects the terminal 42#11 thereto, transmitting an ISDN-ALERT/CONN (call/response) message to the gateway 119#1. The gateway 119#1 sets the ISDN-ALERT/CONN (call/response) message received from the telephone exchange 44#1 in the audio channel for transmitting and receiving ISDN messages, transmitting the ISDN-ALERT/CONN message to the gateway 119#2.

The gateway 119#2 passes on the ISDN-ALERT/CONN message received through the audio channel to the telephone exchange 44#2. In addition, when a CONN message is received, an audio channel with a number of typically 2 is opened for a conversation, allowing the conversation to be held between the gateways 119#1 and 119#2. At that time, the gateway 119#2 stores the number of the audio channel for a conversation in an entry of the call-number-associated-Internet-audio-channel management table 114 indicated by the call number CR1 of the ISDN message which is used as an index. In this way, since a signal channel is not opened each time a call is made from the telephone exchange 44#2, the sequence becomes simpler and a plurality of audio channels can be controlled by using 1 audio channel for transmitting and receiving ISDN messages.

In order to make a transfer from the terminal 42#11 to the terminal 42#22, the transfer button is pressed and transfer destination numbers of 710 and 22 are dialed at the terminal 42#11. Then, ISDN messages set in the audio channel for transmitting and receiving ISDN messages opened by the gateway 119#1 are exchanged to open an audio channel between the terminals 42#11 and 42#22. The number of the audio channel is then stored in an entry of the call-number-associated-Internet-audio-channel management table 114 indicated by the call number CR2 serving as an index. As the terminal 42#11 is cut off from the communication, the telephone exchanges 44#1 and 44#2 execute a sequence of transmission and reception of an ISDN-FACILITY message serving as a notice of a transfer destination, an ISDN-FACILITY_ACK message serving as an acknowledgment of the notice of a transfer destination, an ISDN-FACILITY message serving as a request for routing optimization and an ISDN-FACILITY_ACK message. During this sequence, the gateways 119#1 and 119#2 exchange these ISDN messages which are each set in the audio channel for transmitting and receiving ISDN messages. Receiving the ISDN-FACILITY message serving as the request for routing optimization, the telephone exchange 44#2 carries out existing routing optimization processing and processing to connect the terminal 42#21 to the terminal 42#22.

Then, the telephone exchanges 44#1 and 44#2 execute a sequence of transmission and reception of an ISDN-DISC message, an ISDN-REL message and an ISDN-REL_COMP message. As shown in FIG. 29, during this sequence, the gateways 119#1 and 119#2 exchange these ISDN messages which are each set in the audio channel for transmitting and receiving ISDN messages. Receiving the ISDN-REL_COMP message, the gateways 119#1 and 119#2 each search the call-number-associated-Internet-audio-channel management table 114 for an audio channel associated with the call number CR1 and releases the audio channel. The call between the gateways 119#1 and 119#2 is released in accordance with the ISDN-message procedure. Likewise, the gateways 119#1 and 119#2 each search the call-number-associated-Internet-audio-channel management table 114 for an audio channel associated with the call number CR2 and releases the audio channel in the same sequence. Signal channels, H245 channels and audio channels with the channel numbers thereof cataloged in the Internet-calling-destination-line determination table 122 are released for all audio channels for transmitting and receiving ISDN messages in accordance with the H323 message procedure at the end of the operation of the gateway 119#i.

Fifth Embodiment

Figure 30:
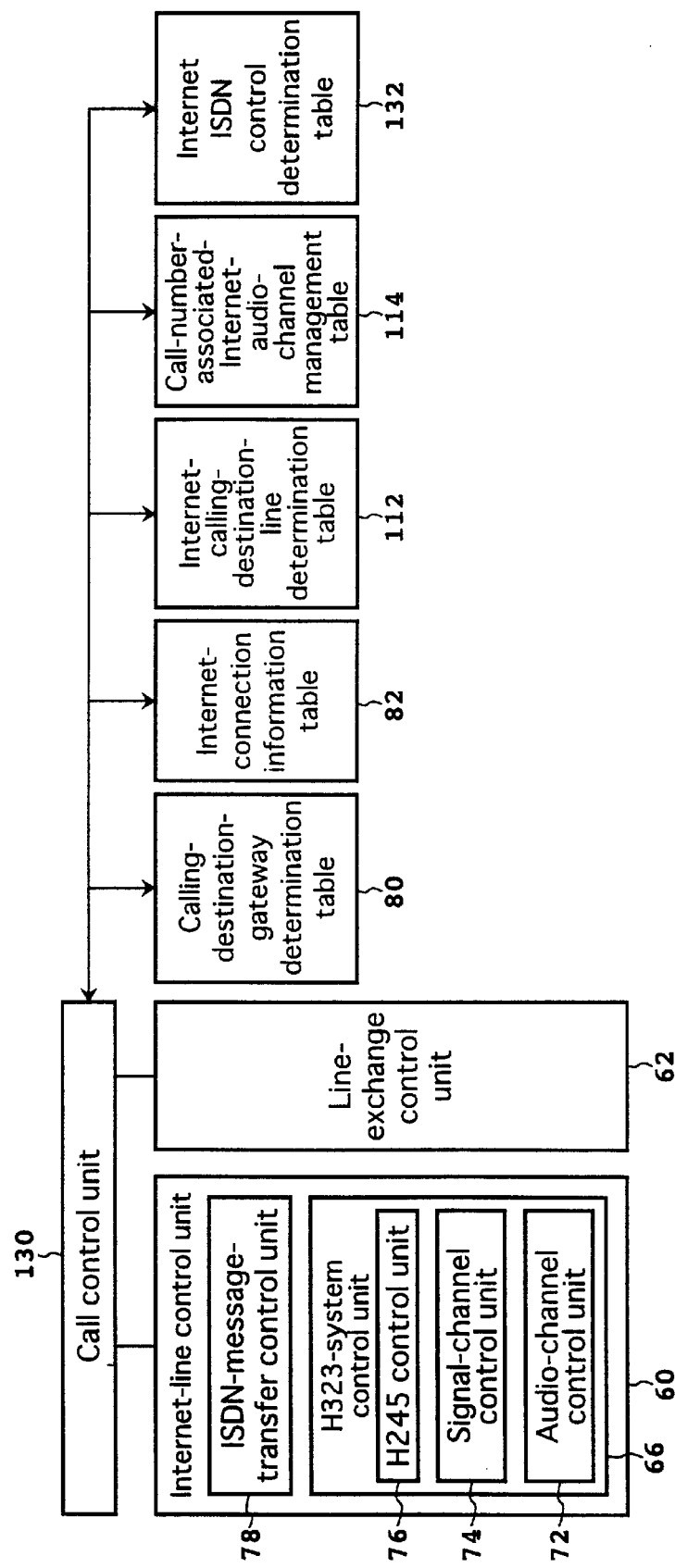
FIG. 30 is a diagram showing the configuration of a gateway implemented by a fifth embodiment of the present invention.

FIG. 30 is a diagram showing the configuration of a gateway implemented by a fifth embodiment of the present invention. The gateway implemented by the fifth embodiment is provided for an assumed case in which the gateways implemented by the first, second, third and fourth embodiments and gateways having no functions thereof or gateways other than the gateways implemented by the first, second, third and fourth embodiments coexist in the Internet-telephony gateway system. A call control unit 130 executes control in accordance with the type of a called gateway when receiving an ISDN-SETUP message from a telephone exchange 44#i. If the called gateway is a gateway implemented by the first embodiment, for example, the call control unit 130 executes gateway control according to the first embodiment. That is to say, the call control unit 130 executes control in accordance with the implementation of a called gateway. If the called gateway is a gateway having no functions of the embodiments, on the other hand, the call control unit 130 executes existing gateway control based on the H323 protocol procedure.

Figure 31:
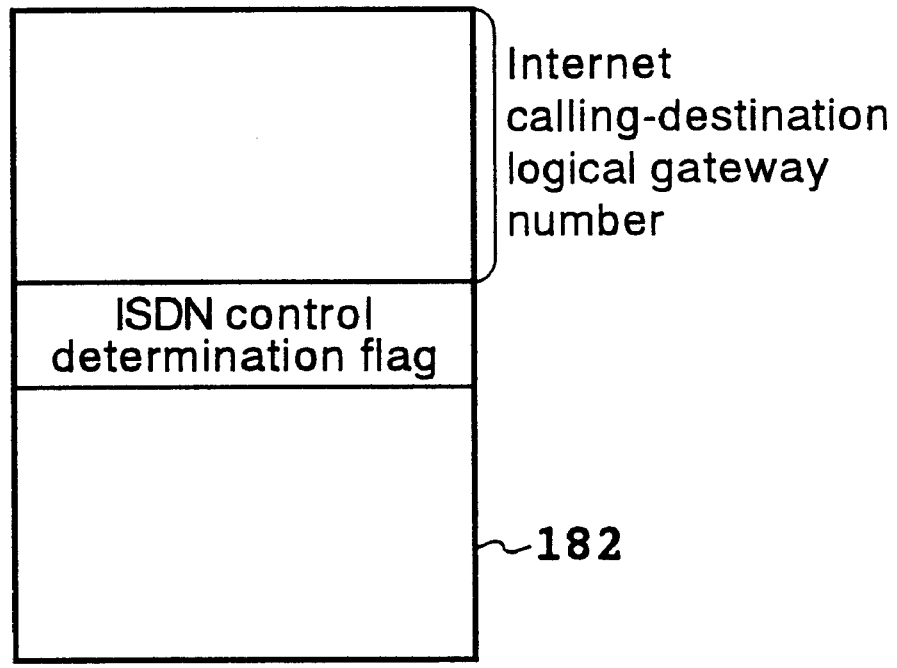
FIG. 31 is a diagram showing the structure of an Internet-ISDN-control determination table employed in the configuration of the gateway shown in FIG. 30.

FIG. 31 is a diagram showing the structure of an Internet ISDN control determination table 132 employed in the configuration of the gateway shown in FIG. 30. As shown in FIG. 31, in the Internet ISDN control determination table 132 is stored an array of ISDN control signal determination flags for called gateways at a memory area corresponding to the Internet logical gateway numbers used as indexes. Each of the ISDN control signal determination flags is set at a value determined by the type of the ISDN logical gateway numbers. To be more specific, if the called gateway is a gateway implemented by the first embodiment, for example, the ISDN control signal determination flag thereof is set at 1. If the called gateway is a gateway implemented by the second, third or fourth embodiment, on the other hand, the ISDN control signal determination flag thereof is set at 2, 3 or 4 respectively. If the called gateway is a gateway having no functions of the first, second, third and fourth embodiments, the ISDN control signal determination flag thereof is set at 0.

The operation of the gateway implemented by the fifth embodiment shown in FIG. 30 is explained as follows. The fifth embodiment is the same as the other embodiments as far as the setting of various kinds of information is concerned. The ISDN control signal determination flags for all other gateways constituting the Internet-telephony gateway system are entered via a maintenance console along with the Internet calling-destination logical numbers of the gateways, and cataloged in entries of the Internet ISDN control determination table 132 indicated by the Internet calling-destination logical numbers. The user of a terminal dials an Internet calling-destination special number and the number of a called terminal to make an Internet call. Receiving an ISDN-SETUP message, the gateway connected to the telephone exchange accommodating the terminal searches the calling-destination-gateway determination table 80 for the logical number of a gateway serving as a calling destination indicated by the called-party-number information element of the ISDN-SETUP message.

The calling gateway then searches the Internet ISDN control determination table 132 for an ISDN control signal determination flag associated with the logical number of the called gateway found in the search of the calling-destination-gateway determination table 80. Then, the calling gateway carries out processing in accordance with the ISDN control signal determination flag found in the search of the Internet ISDN control determination table 132. If the value of the ISDN control signal determination flag is 1, for example, the control according to the first embodiment is executed. If the value of the ISDN control signal determination flag is 2, 3 or 4, on the other hand, the control according to the second, third or fourth embodiment respectively is executed. If the value of the ISDN control signal determination flag is 0, the existing gateway control based on the H323 protocol procedure is executed.

As described above, according to the present invention, a path can be connected effectively at a transfer through the Internet. As a result, since Internet lines can be utilized effectively and no wasteful CODEC control is executed, the present invention contributes much to the improvement of the quality of the sound and the processing power.

It should be noted that the present invention is not limited to the details of the preferred embodiments described above to the bitter end. Rather, the scope of the present invention is defined by appended claims, and all changes as well as modifications falling within the equivalence of the scope of the claims are therefore to be embraced by the present invention.

What is claimed is:

1. A gateway connected to the Internet and a telephone exchange accommodating a plurality of terminals and carrying out routing optimization processing based on a first message used as a request for path optimization, said gateway comprising:

a call setting means for:
determining an IP (Internet Protocol) address of a second gateway corresponding to a calling-destination special number of a called telephone exchange used as a called communication partner and connected to said second gateway on the basis of a second message which is received from said connected telephone exchange, includes said calling-destination special number of said called telephone exchange and a telephone number of a called terminal accommodated in said called telephone exchange and serves as a request for call setting; and
transmitting a third message serving as a request for said call setting to said second gateway serving as a communication partner by using said IP address by way of said Internet to open a control channel to said second gateway;

a first message transmitting means for setting a fourth message received from said connected telephone exchange in a message to be transmitted by using said control channel and transmitting said message to said second gateway serving as a communication partner by way of said Internet;

a second message transmitting means for extracting a fifth message and transmitting said fifth message to said connected telephone exchange when receiving a message coming from said control channel and including said fifth message set therein and transmitted by said called telephone exchange;

an audio-channel opening means for opening an audio channel for a conversation between a calling terminal accommodated in said connected telephone exchange and said called terminal when receiving a message including a set sixth message issued by said called telephone exchange serving as a called communication partner through said control channel in response to said second message; and a channel releasing means for releasing said control channel and said audio channel when receiving a message including a set seventh message serving as a request for releasing of said control channel and said audio channel from said control channel.

2. A gateway according to claim 1 wherein:

said connected telephone exchange is connected to said gateway by an ISDN line; and said first message transmitting means adds a new information element to an H323•Q931 user information message, and sets said fourth message in said new information element prior to message transmission.

3. A gateway connected to the Internet and a telephone exchange accommodating a plurality of terminals and carrying out routing optimization processing based on a first message used as a request for path optimization, said gateway comprising:

a call setting means for:
determining an IP (Internet Protocol) address of a second gateway corresponding to a calling-destination special number of a called telephone exchange used as a called communication partner and connected to said second gateway on the basis of a second message which is received from said connected telephone exchange, includes said calling-destination special number of said called telephone exchange and a telephone number of a called terminal accommodated in said called telephone exchange and serves as a request for call setting; and
transmitting a third message serving as a request for said call setting to said second gateway serving as a communication partner by using said IP address by way of said Internet to open a control channel and a first audio channel to said second gateway;

a first message transmitting means for transmitting a fourth message received from said connected telephone exchange by using said first audio channel to said second gateway serving as a communication partner by way of said Internet;

a second message transmitting means for extracting a fifth message and transmitting said fifth message to said connected telephone exchange when receiving said fifth message transmitted by said called telephone exchange through said first audio channel;

an audio-channel opening means for opening a second audio channel for a conversation between a calling terminal accommodated in said connected telephone exchange and said called terminal when receiving a sixth message issued by said called telephone exchange serving as a called communication partner through said first audio channel in response to said second message; and a channel releasing means for releasing said control channel, said first audio channel and said second audio channel when receiving a seventh message serving as a request for releasing of said control channel, said first audio channel and said second audio channel from said first audio channel.

4. A gateway according to claim 3 wherein:

said connected telephone exchange is connected to said gateway by an ISDN line;

said control channel is an H323 signal channel; and said first and second audio channels are each an H323 audio channel.

5. A gateway connected to the Internet and a telephone exchange accommodating a plurality of terminals and carrying out routing optimization processing based on a first message used as a request for path optimization, said gateway comprising:

a first table for storing relations between calling-destination special numbers identifying telephone exchanges and IP (Internet Protocol) addresses of second gateways connected to said telephone exchanges identified by said calling-destination special numbers;

a call setting means for transmitting second messages each serving as a request for call setting to said second gateways identified by said IP addresses stored in said first table by using said IP addresses by way of said Internet to open in advance a control channel to each of said second gateways;

a second table for storing relations between said second gateways each with an opened control channel and said opened control channels;

a first message transmitting means for:
searching said first table for one of said IP addresses corresponding to a calling-destination special number of a called telephone exchange connected to one of said second gateways and used as a called communication partner on the basis of a third message which is received from said connected telephone exchange, includes said calling-destination special number of said called telephone exchange and a telephone number of a called terminal accommodated in said called telephone exchange and serves as a request for call setting;
searching said second table for one of said opened control channels associated with a third gateway, that is, one of said second gateways identified by said IP address found from said first table; and
setting said third message in a message to be transmitted by using said opened control channel found from said second table and transmitting said message to said third gateway serving as a communication partner by using said IP address found from said first table by way of said Internet;

a second message transmitting means for setting a fourth message received from said connected telephone exchange in a message to be transmitted by using said opened control channel found from said second table and transmitting said message to said third gateway serving as a communication partner by way of said Internet;

a third message transmitting means for extracting a fifth message and transmitting said fifth message to said connected telephone exchange when receiving a message coming from said opened control channel found from said second table and including said fifth message set therein and transmitted by said called telephone exchange;

an audio-channel opening means for opening an audio channel for a conversation between a calling terminal accommodated in said connected telephone exchange and said called terminal when receiving a message including a set sixth message issued by said called telephone exchange serving as a called communication partner through said opened control channel found from said second table in response to said third message; and a channel releasing means for releasing said audio channel when receiving a message including a set seventh message serving as a request for releasing of said audio channel from said opened control channel found from said second table.

6. A gateway according to claim 5 wherein:

said connected telephone exchange is connected to said gateway by an ISDN line; and said first message transmitting means adds a new information element to an H323•Q931 user information message, and sets said third message in said new information element prior to message transmission; and said second message transmitting means adds a new information element to an H323•Q931 user information message, and sets said fourth message in said new information element prior to message transmission.

7. A gateway according to claim 5 wherein:

said audio-channel opening means stores a relation between said opened audio channel and a call number set in said third message in a third table; and said channel releasing means searches said third table for an audio channel corresponding to a call number set in said seventh message and releases said audio channel.

8. A gateway according to claim 5 wherein:

a fourth table is further provided for storing an ISDN control determination flag for each of said second gateways with an IP address thereof stored in said first table;

said ISDN control determination flag indicates whether or not an ISDN message can be transferred to one of said second gateways associated with said ISDN control determination flag; and said call setting means makes an Internet call based on said ISDN control determination flag stored in said fourth table.

9. A gateway connected to the Internet and a telephone exchange accommodating a plurality of terminals and carrying out routing optimization processing based on a first message used as a request for path optimization, said gateway comprising:

a first table for storing relations between calling-destination special numbers identifying telephone exchanges and IP (Internet Protocol) addresses of second gateways connected to said telephone exchanges identified by said calling-destination special numbers;

a call setting means for transmitting a second message serving as a request for call setting to said second gateways identified by said IP addresses stored in said first table by using said IP addresses by way of said Internet to open in advance a control channel and a first audio channel to each of said second gateways;

a second table for storing relations between said second gateways each with an opened control channel and an opened first audio channel and said opened control channels and said opened first audio channel;

a first message transmitting means for:

searching said first table for one of said IP addresses corresponding to a calling-destination special number of a called telephone exchange used as a called communication partner and connected to one of said second gateways on the basis of a third message which is received from said connected telephone exchange, includes said calling-destination special number of said called telephone exchange and a telephone number of a called terminal accommodated in said called telephone exchange and serves as a request for call setting;

searching said second table for one of said opened first audio channels associated with a third gateway, that is, one of said second gateways identified by said IP address found from said first table; and setting said third message in a message to be transmitted by using said opened first audio channel found from said second table and transmitting said message to said third gateway serving as a communication partner by using said IP address found from said first table by way of said Internet;

a second message transmitting means for setting a fourth message received from said connected telephone exchange in a message to be transmitted by using said opened first audio channel found from said second table and transmitting said message to said third gateway serving as a communication partner by way of said Internet;

a third message transmitting means for extracting a fifth message and transmitting said fifth message to said connected telephone exchange when receiving a message coming from said opened first audio channel found from said second table and including said fifth message set therein and transmitted by said called telephone exchange;

an audio-channel opening means for opening a second audio channel for a conversation between a calling terminal accommodated in said connected telephone exchange and said called terminal when receiving a message including a set sixth message issued by said called telephone exchange serving as a called communication partner through said opened first audio channel found from said second table in response to said third message; and a channel releasing means for releasing said second audio channel when receiving a message including a set seventh message serving as a request for releasing of said second audio channel from said opened first audio channel found from said second table.

10. A gateway according to claim 9 wherein:

said connected telephone exchange is connected to said gateway by an ISDN line;

said control channel is an H323 signal channel; and said first and second audio channels are each an H323 audio channel.

* * * * *